(12) United States Patent
Ito et al.

(10) Patent No.: US 9,001,062 B2
(45) Date of Patent: Apr. 7, 2015

(54) METHOD FOR CONTROLLING COMPUTER THAT IS HELD AND OPERATED BY USER USING A RE-TOUCH DETERMINATION AREA

(71) Applicant: NAMCO BANDAI Games Inc., Tokyo (JP)

(72) Inventors: Shogo Ito, Tokyo (JP); Takashi Nakagawa, Tokyo (JP); Yoshihito Nakagawa, Tokyo (JP)

(73) Assignee: BANDAI NAMCO Games Inc., Tokyo (JP)

( * ) Notice: Subject to any disclaimer, the term of this patent is extended or adjusted under 35 U.S.C. 154(b) by 142 days.

(21) Appl. No.: 13/654,707

(22) Filed: Oct. 18, 2012

(65) Prior Publication Data

US 2013/0123014 A1    May 16, 2013

(30) Foreign Application Priority Data

Nov. 16, 2011 (JP) .................................. 2011-250302

(51) Int. Cl.
  *G06F 3/041* (2006.01)
  *G06F 3/0488* (2013.01)
  *G06F 1/16* (2006.01)

(52) U.S. Cl.
  CPC .......... *G06F 3/04883* (2013.01); *G06F 1/1626* (2013.01); *G06F 3/041* (2013.01); *G06F 1/169* (2013.01); *A63F 2300/1075* (2013.01); *A63F 2300/204* (2013.01); *A63F 2300/6045* (2013.01); *A63F 2300/6661* (2013.01)

(58) Field of Classification Search
  CPC ..................................................... G06F 3/0418
  USPC ..................... 345/173, 178; 178/18.01, 18.02
  See application file for complete search history.

(56) References Cited

U.S. PATENT DOCUMENTS

| | | | | |
|---|---|---|---|---|
| 5,543,588 A | * | 8/1996 | Bisset et al. | 345/173 |
| 5,729,219 A | * | 3/1998 | Armstrong et al. | 345/173 |
| 6,909,424 B2 | * | 6/2005 | Liebenow et al. | 345/173 |
| 7,012,595 B2 | * | 3/2006 | Lu | 345/173 |
| 2002/0158851 A1 | | 10/2002 | Mukai et al. | |
| 2003/0234768 A1 | * | 12/2003 | Rekimoto et al. | 345/169 |
| 2007/0291015 A1 | * | 12/2007 | Mori | 345/173 |
| 2010/0013777 A1 | * | 1/2010 | Baudisch et al. | 345/173 |
| 2010/0056220 A1 | * | 3/2010 | Oh et al. | 345/173 |
| 2010/0103136 A1 | * | 4/2010 | Ono et al. | 345/173 |
| 2010/0149129 A1 | | 6/2010 | Homma et al. | |
| 2010/0295799 A1 | * | 11/2010 | Nicholson et al. | 345/173 |

(Continued)

FOREIGN PATENT DOCUMENTS

| | | |
|---|---|---|
| JP | 2011-36424 A | 2/2011 |
| JP | 2012-221478 A | 11/2012 |

OTHER PUBLICATIONS

European Search Report dated Feb. 11, 2013 in corresponding EPC Application No. 12190125.0 (with English translation).

*Primary Examiner* — Adam J Snyder
(74) *Attorney, Agent, or Firm* — Posz Law Group, PLC

(57) ABSTRACT

When a cube has been selected, and a touch operation has been canceled, a retouch determination area that is larger than the original selection area for selecting the cube is set based on a touch cancellation position. When a retouch operation has been detected within the retouch determination area after the touch operation has been canceled, it is determined that the same position as the touch cancellation position has been retouched, and the cube (object) is moved.

18 Claims, 26 Drawing Sheets

(56) References Cited

U.S. PATENT DOCUMENTS

| | | |
|---|---|---|
| 2011/0012921 A1 | 1/2011 | Cholewin et al. |
| 2011/0057889 A1 | 3/2011 | Sakatsume |
| 2011/0141045 A1* | 6/2011 | Choi et al. .................... 345/173 |
| 2011/0157053 A1* | 6/2011 | Webb et al. .................... 345/173 |
| 2012/0231884 A1* | 9/2012 | Sakai ............................. 345/173 |

* cited by examiner

FIG. 6
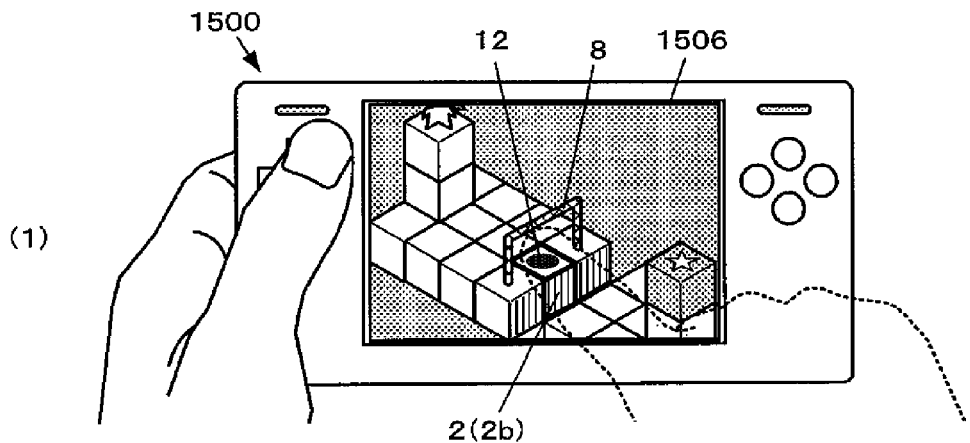
(1)
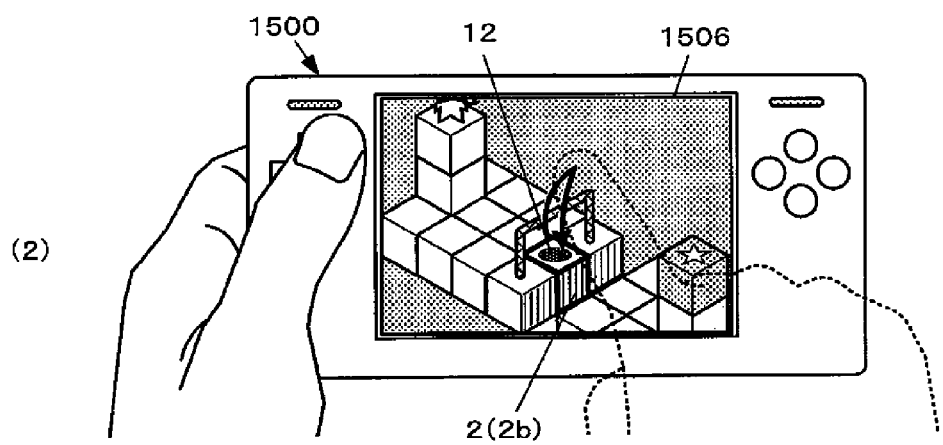
(2)
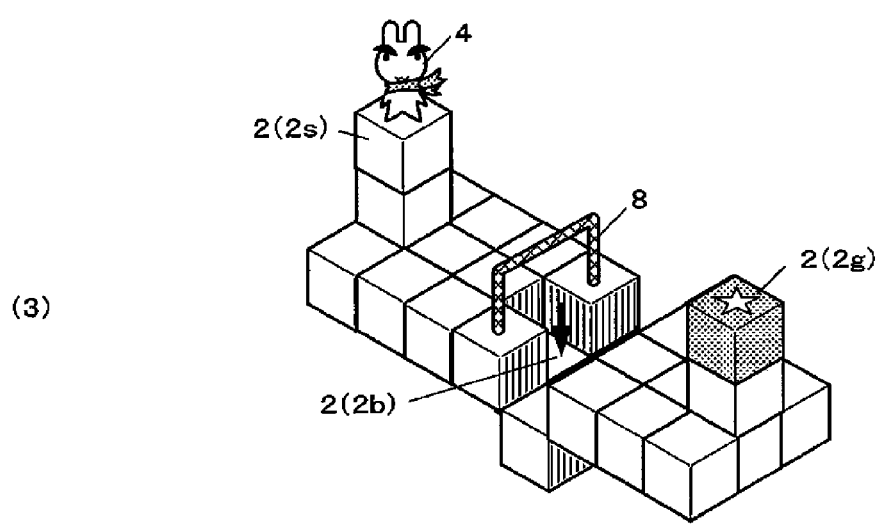
(3)

FIG. 7
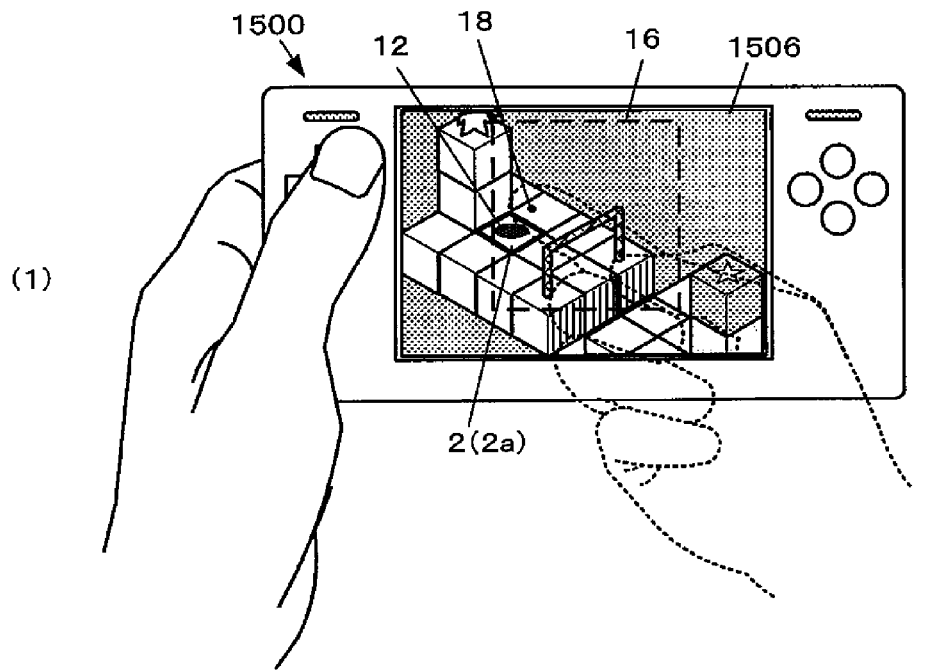
(1)
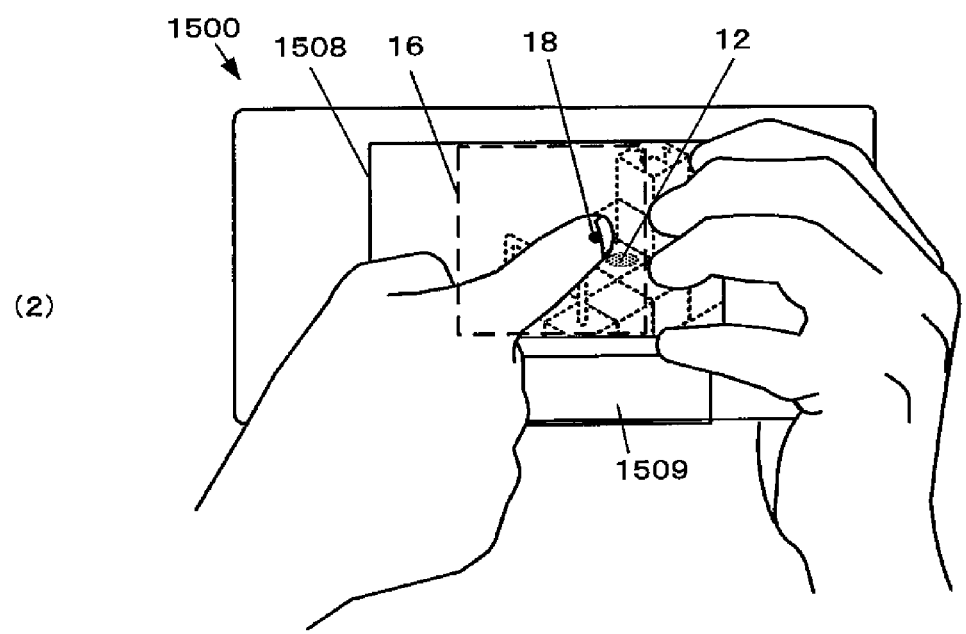
(2)

FIG. 8
(1)
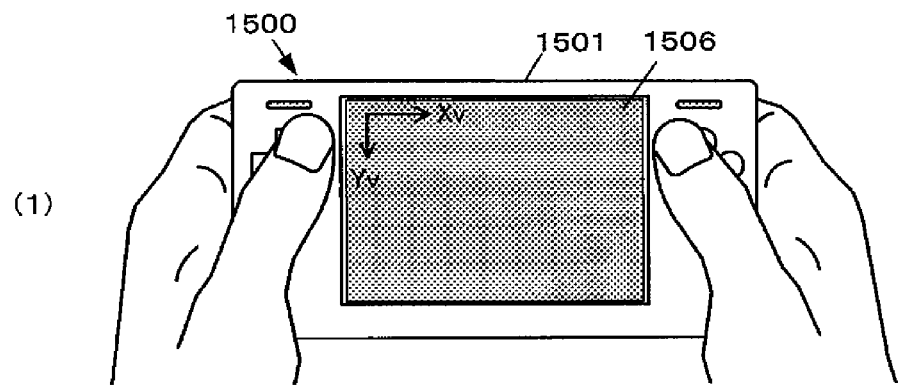
(2)
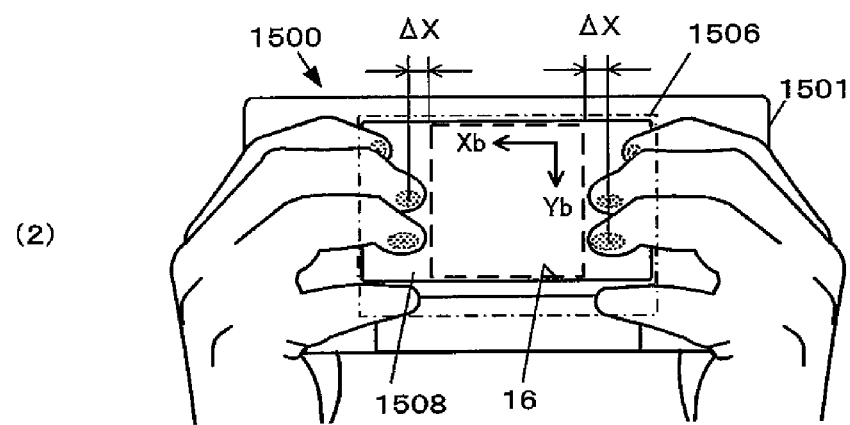
(3)
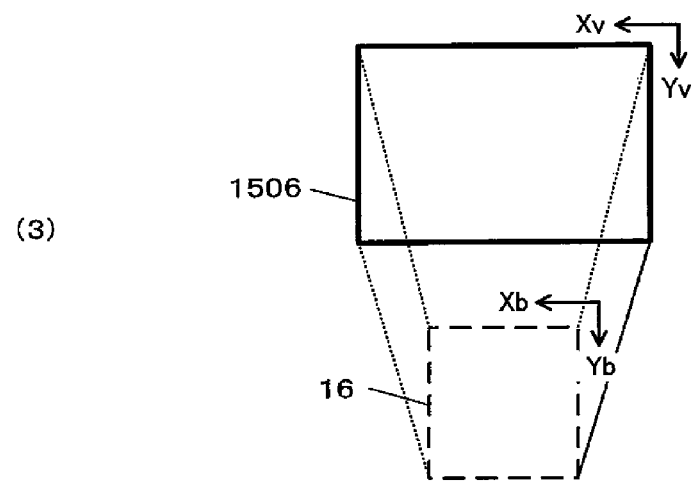

FIG. 9
(1)
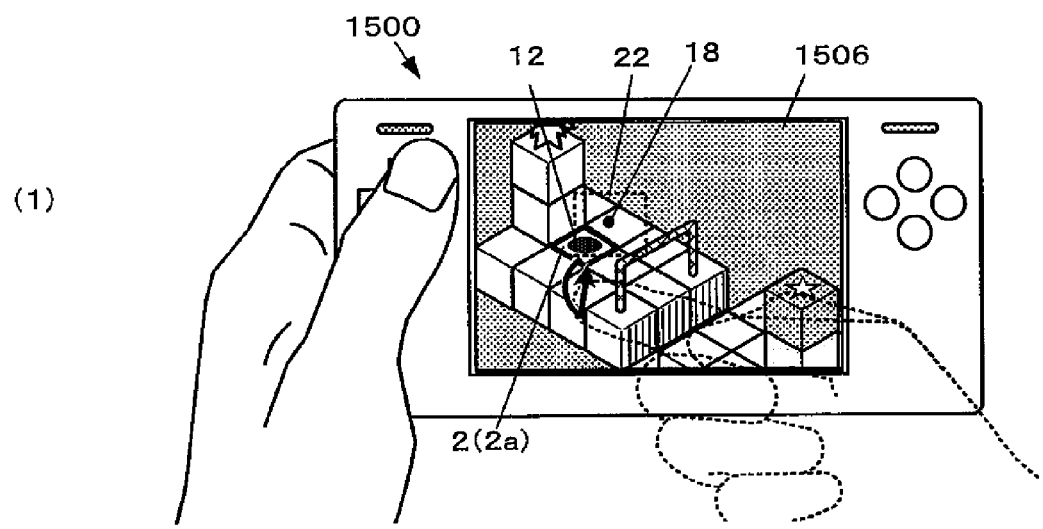
(2)
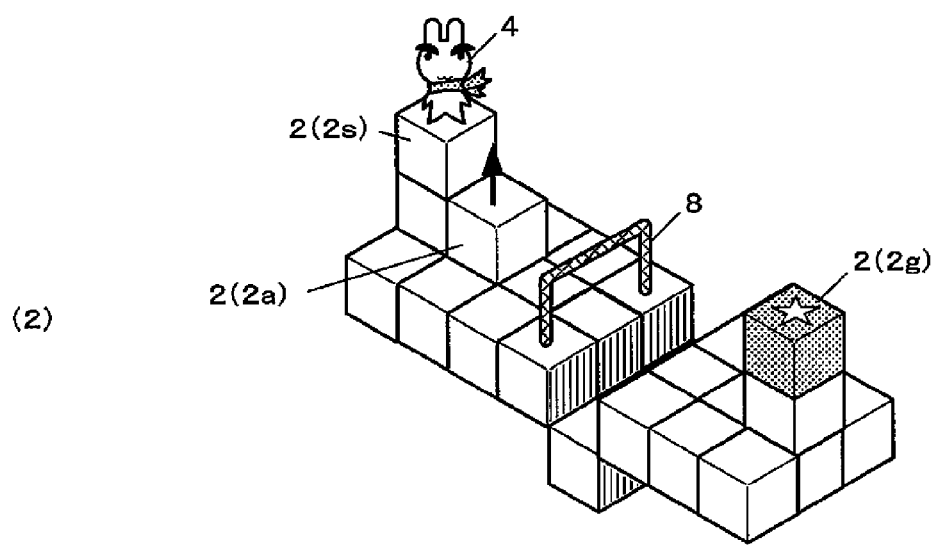

FIG. 14

526 — RETOUCH DETERMINATION AREA INITIAL SETTING DATA

526a —

| APPLICATION TARGET | TOUCH PANEL |
|---|---|

| FINGER SIZE | REFERENCE SHAPE | AREA SIZE (REPRESENTATIVE DIMENSIONS OF BASIC SHAPE) |
|---|---|---|
| SMALL SIZE | DISPLAY SHAPE | CUBE DISPLAY WIDTH × 1.0 |
| MEDIUM SIZE | DISPLAY SHAPE | CUBE DISPLAY WIDTH × 1.0 |
| LARGE SIZE | DISPLAY SHAPE | CUBE DISPLAY WIDTH × 1.0 |

526a —

| APPLICATION TARGET | REAR TOUCH PAD |
|---|---|

| FINGER SIZE | REFERENCE SHAPE | AREA SIZE (REPRESENTATIVE DIMENSIONS OF BASIC SHAPE) |
|---|---|---|
| SMALL SIZE | SQUARE | CUBE DISPLAY WIDTH × 1.2 |
| MEDIUM SIZE | SQUARE | CUBE DISPLAY WIDTH × 1.6 |
| LARGE SIZE | SQUARE | CUBE DISPLAY WIDTH × 1.8 |

FIG. 28
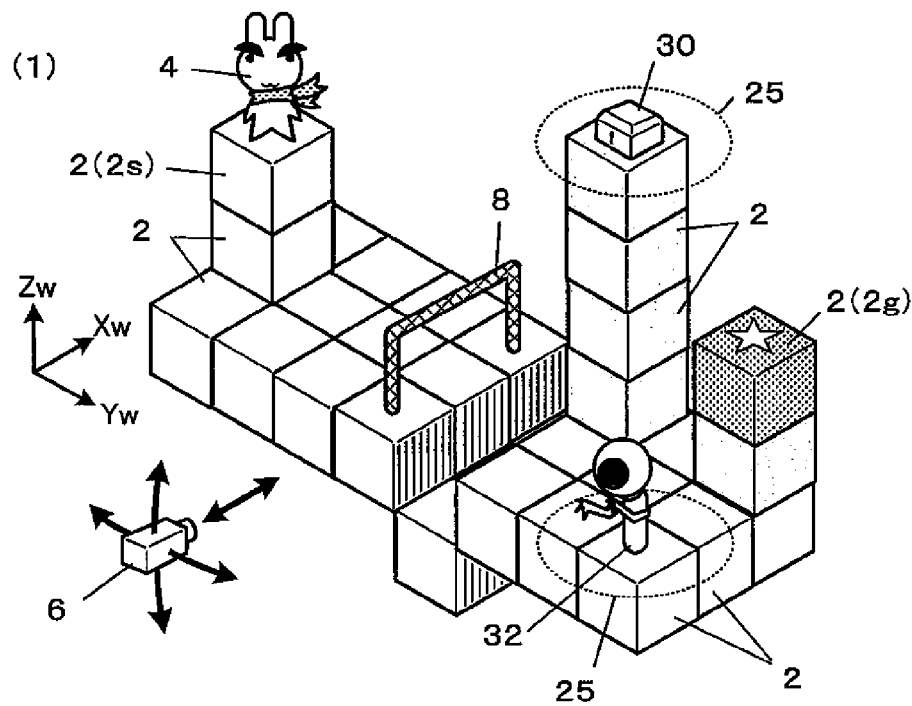
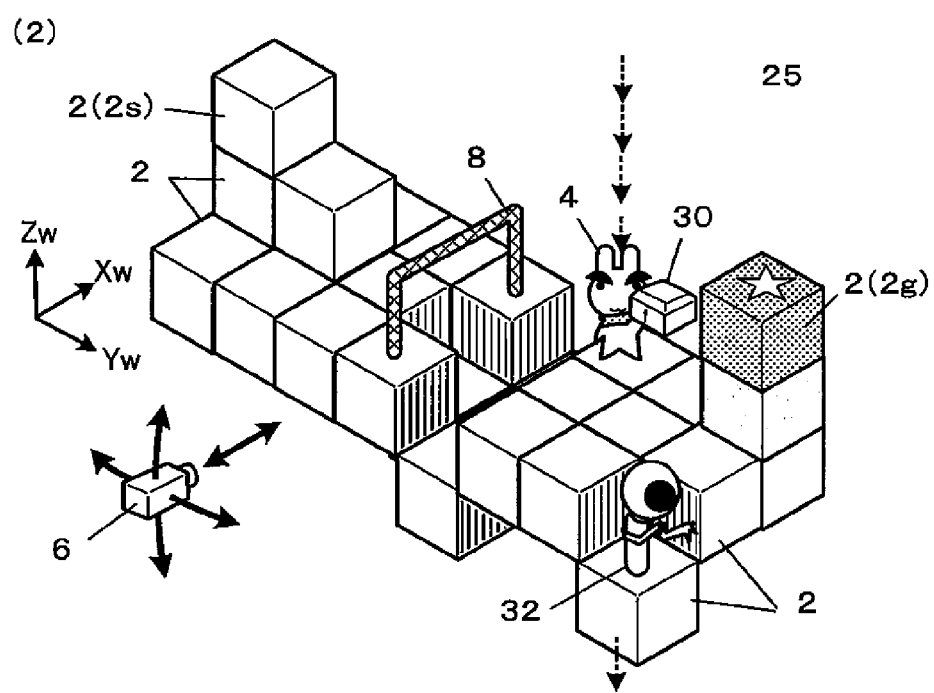

METHOD FOR CONTROLLING COMPUTER THAT IS HELD AND OPERATED BY USER USING A RE-TOUCH DETERMINATION AREA

Japanese Patent Application No. 2011-250302 filed on Nov. 16, 2011, is hereby incorporated by reference in its entirety.

BACKGROUND

In recent years, an electronic instrument such as a portable game device may be provided with a touch panel (.e., a combination of a flat panel display (display device) and a pointing device) ,An electronic instrument may include a touch panel on the front side and a touch pad on the back side so that the user can perform a touch operation on the front side and the back side of the electronic instrument (see JP-A-2011-36424, for example).

When an electronic instrument includes a touch pad on the back side, information about an operation input (e.g., menu screen) is normally displayed on the display provided on the front side. The user can operate the touch panel provided on the front side while observing an object displayed on the screen as if to directly touch the object.

However, since the user cannot observe the position of a finger or the like that touches the touch pad provided on the back side, it is difficult for the user to operate the touch pad provided on the back side as compared with the touch panel provided on the front side.

A touch operation input method has been widely used that allows the user to input an action to the selected target by selecting the target by performing a touch operation, removing a finger or the like from the touch pad or touch panel (canceling the touch operation), and retouching the target. For example, the touch operation input method allows the user to select a menu button displayed on a menu screen by performing a touch operation, and display a submenu by performing a retouch operation.

When the user performs such an operation on the touch panel provided on the front side, the user easily operate the touch panel while observing the menu screen displayed on the touch panel. However, it is difficult for the user to determine the touch position when performing a touch operation on the touch pad provided on the back side since the user cannot observe the movement of the finger. Therefore, the touch position may be shifted when retouching the target selected by performing the touch operation. The user may be confused if the retouch operation performed by the user is not appropriately reflected in the game. The user may not be able to smoothly play the game (particularly a time-trial game), and may not be involved in the game if such a situation occurs.

SUMMARY

According to one aspect of the invention, there is provided a method for controlling a computer that is held and operated by a user, the method comprising:

displaying a plurality of objects on a display device that is provided on a front side of the computer;

selecting one object among the plurality of objects based on a positional relationship between position of a first, touch operation and a display position on the display device when the user has performed the first touch operation on a touch-operated device that is provided on a back side of the computer that cannot be observed by the user when the user observes the display device;

setting a determination area for reselecting the one object on the touch-operated device; and performing a given control process on the one object when the user has performed a second touch operation within the determination area.

According to another aspect of the invention, there is provided a method for controlling a computer that is held and operated by a user, the computer including a display device and a front touch-operated device integrated with the display device on a front side, and including a rear touch-operated device on a back side, the method comprising:

displaying an object on the display device;

setting a front determination area to the front touch-operated device, and setting a rear determination area that is larger than the front determination area to the rear touch-operated device as a determination area for selecting the object; and performing a first control process on the object when the user has performed a touch operation within the front determination area, and performing a second control process on the object when the user has performed a touch operation within the rear determination area.

BRIEF DESCRIPTION OF THE DRAWINGS

FIG. 6 is a view illustrating an example of a game operation using a touch panel, and an example of a change in game space due to the game operation.

FIG. 7 is a view illustrating an example of a game operation using a rear touch pad.

FIG. 8 is a schematic view illustrating an example of an effective range setting method.

FIG. 9 is a view illustrating an example of a game operation using a rear touch pad, and an example of a change in game space due to the game operation.

FIG. 14 is a view illustrating a data configuration example of retouch determination area initial setting data.

FIG. 23 is a flowchart illustrating the flow of the main process performed by a game server according to the second embodiment for managing a game played by one player who has logged in.

FIG. 28 is a view illustrating a setting example of a determination area that corresponds to a retouch determination area.

Figure 1:
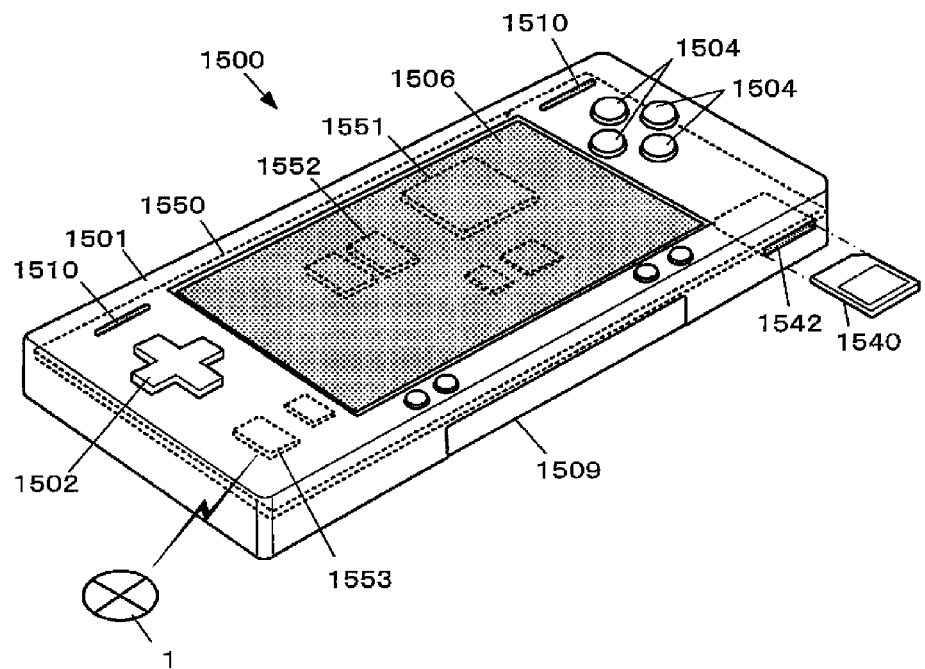
FIG. 1 is a perspective external view (front side) illustrating a configuration example of a game device.

DESCRIPTION OF EXEMPLARY
EMBODIMENTS

Several embodiments of the invention may improve operability when using a touch-operated device (i.e., touch position detection-type pointing device) that is provided at such a position that the user cannot observe the operation state of the touch-operated device.

According to one embodiment of the invention, there is provided a method for controlling a computer that is held and operated by a user, the method comprising:

displaying a plurality of objects on a display device that is provided on a front side of the computer;

selecting one object among the plurality of objects based on a positional relationship between a position of a first touch operation and a display position on the display device when the user has performed the first touch operation on a touch-operated device that is provided on a back side of the computer that cannot be observed by the user when the user observes the display device;

setting a determination area for reselecting the one object on the touch-operated device; and performing a given control process on the one object when the user has performed a second touch operation within the determination area.

According to another embodiment of the invention, there is provided an electronic instrument that is held and operated by a user, the electronic instrument comprising:

a display device that is provided on a front side of the electronic instrument;

a touch-operated device that is provided on a back side of the electronic instrument;

an object display control section that displays a plurality of objects on the display device;

a detection section that detects that one object among the plurality of objects has been selected when the user has performed a first touch operation based on a positional relationship between a position of the first touch operation and a display position on the display device;

a determination area setting section that sets a determination area for reselecting the one object on the touch-operated device; and an object control section that performs a given control process on the one object when the user has performed a second touch operation within the determination area.

According to the above configuration, one object among the plurality of objects displayed on the display device can be selected corresponding to the touch operation performed on the touch-operated device. The determination area for determining whether or not the currently selected object has been reselected is provided within the touch operation area of the touch-operated device (i.e., the touch position detection area or the detection range of a touch sensor) when the touch operation has been canceled after the object has been selected. This makes it possible to allow a shift in retouch position. Therefore, it is possible to improve operability when using a touch-operated device that is provided at such a position that the user cannot observe the operation state of the touch-operated device (e.g., the moving state of a finger that operates the touch-operated device).

In the method, the setting of the determination area may include setting a range as the determination area, the range at least including a touch operation range of the touch-operated device that corresponds to a display range of the one object based on a positional relationship between the front side and the back side of the computer.

According to the above configuration, the determination area can be set to be a range that includes the touch operation range that corresponds to the display range of the selected object and is larger than the touch operation range. Specifically, since a range larger than the range when the object has been selected is set as the retouch range, it is possible to effectively allow a shift in retouch position.

If the determination area is set to be larger than the touch operation range corresponding the display range even if the display range of the selected object is sufficiently large, the control process may be performed on the selected object even if the retouch position s clearly shifted from the previous touch position.

In the method, the setting of the determination area may include changing a size of the touch operation range based on a display size of the one object.

This makes it possible to determine whether to set the touch operation range corresponding to the display range of the selected object as the determination area, or set a range larger than the display range of the selected object as the determination area based on the size of the display range of the selected object. Specifically, the above problem can be solved while allowing a shift in retouch operation by changing the size of the determination area depending on the situation.

In the method, the computer may have a structure that is held and operated by both hands, and may include an operation section that can be operated by a thumb on each side of the display device, the touch-operated device may be provided in a center area of the back side of the computer, and the setting of the determination area may include setting the determination area by extending the touch operation range that corresponds to the display range of the one object so that an extension ratio in a transverse direction is larger than an extension ratio in a vertical direction.

This makes it possible to set a range that is larger than the touch operation range corresponding to the display range of the selected object and is extended in the transverse direction as compared with the vertical direction as the determination area. Specifically, it is possible to more effectively allow a shift in retouch position in the transverse direction. When the computer is held on each side, the user normally performs the touch operation on the back side of the computer while moving a finger in the transverse direction. Therefore, the above feature is particularly effective for such a case.

In the method, the setting of the determination area may include changing the extension ratio in the transverse direction based on the position of the first touch operation.

According to the above configuration, since the extension ratio in the transverse direction can be changed based on the touch position when the object has been selected or the touch operation has been canceled, it is possible to more effectively allow a shift in retouch position (operation).

In the method, the setting of the determination area may include setting an extension area that overlaps or is adjacent to the touch operation range, and setting the determination area by combining the touch operation range and the extension area.

According to the above configuration, the determination area can be set by combining the extension area with the touch operation range corresponding to the display area of the selected object.

In the method, the setting of the extension area may include setting the extension area based on the position of the first touch operation.

This makes it possible to more effectively allow a shift in retouch position (operation).

The method may further comprise:

setting an effective range in a touch operation area of the touch-operated device in an area other than a range in which a finger of the user that holds the computer touches the touch-operated device, the setting of the determination area may include setting the determination area within the effective range.

The above configuration is effective when the user may holds the computer to touch the sensing range of the touch-operated device depending on the shape of the computer, the size of the hand, or the like.

The method may further comprise:

changing a size of the determination area based on a touch area of the first touch operation.

This makes it possible to change the size of the determination area based on the touch operation area. The touch area tends to increase as the finger size increases, for example. Therefore, it is possible to provide a determination area having an appropriate size corresponding to the finger size (thickness) by changing the size of the determination area corresponding to the touch area, This prevents a situation in which the effect of allowing a shift in touch position (operation) is affected by the finger size (thickness) of the user, a peculiar touch operation of the user, and the like.

The method may further comprise:

determining a shift tendency between the position of the first touch operation and a position of the second touch operation, the setting of the determination area may setting the determination area based on the shift tendency.

This makes it possible to set the determination area corresponding to the shift tendency of the touch position in the determination area. This makes it possible to more effectively allow a shift in retouch position (operation).

According to another embodiment of the invention, there is provided a method for controlling a computer that is held and operated by a user, the computer including a display device and a front touch-operated device integrated with the display device on a front side, and including a rear touch-operated device on a back side, the method comprising:

displaying an object on the display device;

setting a front determination area to the front touch-operated device, and setting a rear determination area that is larger than the front determination area to the rear touch-operated device as a determination area for selecting the object; and performing a first control process on the object when the user has performed a touch operation within the front determination area, and performing a second control process on the object when the user has performed a touch operation within the rear determination area.

According to another embodiment of the invention, there is provided an electronic instrument that is held and operated by a user, the electronic instrument comprising:

a display device and a front touch-operated device integrated with the display device, the display device and the front touch-operated device being provided on a front side of the electronic instrument;

a rear touch-operated device that is provided on a back side of the electronic instrument;

an object display control section that displays an object on the display device;

a determination area setting section that sets a front determination area to the front ouch-operated device, and sets a rear determination area that is larger than the front determination area to the rear touch-operated device as a determination area for selecting the object; and an object control section that performs a first control process on the object when the user has performed a touch operation within the front determination area, and performs a second control process on the object when the user has performed a touch operation within the rear determination area.

According to the above configuration, the determination area for the rear touch-operated device can be set to be larger than the determination area for the front touch-operated device. The user cannot operate the rear touch-operated device while observing the rear touch-operated device. However, it is possible to compensate for a deterioration in operation feel due to the above problem by setting he determination area for the rear touch-operated device to be larger than the determination area for the front touch-operated device. An excellent operation feel can be implemented for the front touch-operated device and the rear touch-operated device by appropriately setting the determination area for the rear touch-operated device to be larger than the determination area for the front touch-operated device.

The method may further comprise:

disabling the determination area when a given time has elapsed after the first touch operation has been canceled.

A situation in which it is difficult for the user to select one of the adjacent objects can be prevented by setting the determination area setting time limit to increase the determination area.

First Embodiment

A first embodiment according to the invention is described below taking an example in which a video game that utilizes a touch operation is executed using a computer.

Figure 2:
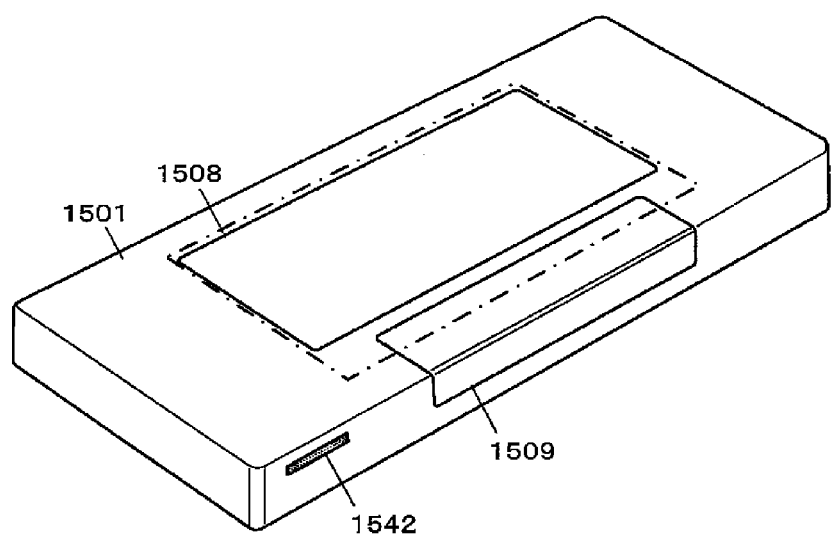
FIG. 2 is a perspective external view (back side) illustrating a configuration example of a game device.

FIGS. 1 and 2 are front perspective external view and a rear perspective external view illustrating a. configuration example of a. game device 1500 (i.e., computer) that is used to play the game according to the first embodiment. The game device 1500 is an electronic instrument that is classified as a portable game device. An arrow key 1502, button switches 1504, a touch panel 1506 (i.e., a device that serves as a display device and a touch-operated device), and speakers 1510 are provided on the front side of the game device 1500. The arrow key 1502 and the button switches 1504 are provided on either side of the touch panel 1506 so that the arrow key 1502, and the button switches 1504 can be operated with the left thumb and the right thumb, respectively.

A rear touch pad 1508 (touch-operated device) and a battery 1509 are provided on the back side of the game device 1500. The rear touch pad 1508 is provided between the right edge and the left edge of a main body 1501 so that the rear touch pad 1508 is positioned almost opposite to the touch panel 1506.

A control board 1550, and a memory card reader 1542 that reads and writes data from and into a memory card 1540 (i.e., computer-readable information storage medium) are provided in the main body 1501. The game device 1500 may also appropriately include a power button, a volume control button, and the like (not illustrated in FIG. 1).

The control board 550 includes a microprocessor (e.g., central processing unit (CPU) 1551, graphics processing unit (GPU), and digital signal processor (DSP)), an application-specific integrated circuit (ASIC), and an IC memory 1552 (e.g., VRAM, RAM, and ROM). The control board 1550 also includes a wireless communication module 1553 for connecting to a wireless base station (e.g., mobile phone base station or wireless LAN base station) via wireless communication.

The control board 1550 further includes interface (I/F) circuits such as a driver circuit that drives the touch panel 1506, a circuit that receives a signal from an input device (e.g. arrow key 1502, button switches 1504, touch panel 1506, and rear touch pad 1508), an output amplifier circuit that outputs a sound signal to the speaker 1510, and a signal input-output circuit that inputs and outputs a signal to and from the memory card reader 1542. The elements included in (mounted on) the control hoard 1550 are electrically connected via a bus circuit or the like so that the elements can exchange data and signals.

The control board 1550 reads a game program, data, and the like necessary for executing the game from the memory card 1540, and temporarily stores the game program, data, and the like in the IC memory 1552. The control board 1550 executes the game program to perform a calculation process, and controls each section of the game device 1500 based on an operation input performed using the arrow key 1502, the button switches 1504, the touch panel 1506, and the rear touch pad 1508 to implement the video game. Note that the game device 1500 may download the necessary program and setting data from a server or the like via a communication line 1 instead of reading the necessary program and setting data from the memory card 1540.

The communication line 1 is a communication channel that enables data communication. Specifically, the communication line 1 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The touch operation area (i.e., the touch position detection range of the touch sensor) of the touch-operated device (i.e., touch panel 1506 and rear touch pad 1508) of the game device 1500 is almost the same as the device size (see FIG. 1). The device size of the rear touch pad 1508 is smaller than he screen size of the touch panel 1506. For example, the alternate long and short dash line in FIG. 2 indicates the outline of the touch panel 1506 that is projected onto the back side of the game device 1500. Note that the size of the touch operation area of the rear touch pad 1508 may be the same as the screen size of the touch panel 1506.

Outline of Game

An outline of the video game according to the first embodiment is described below.

Figure 3:
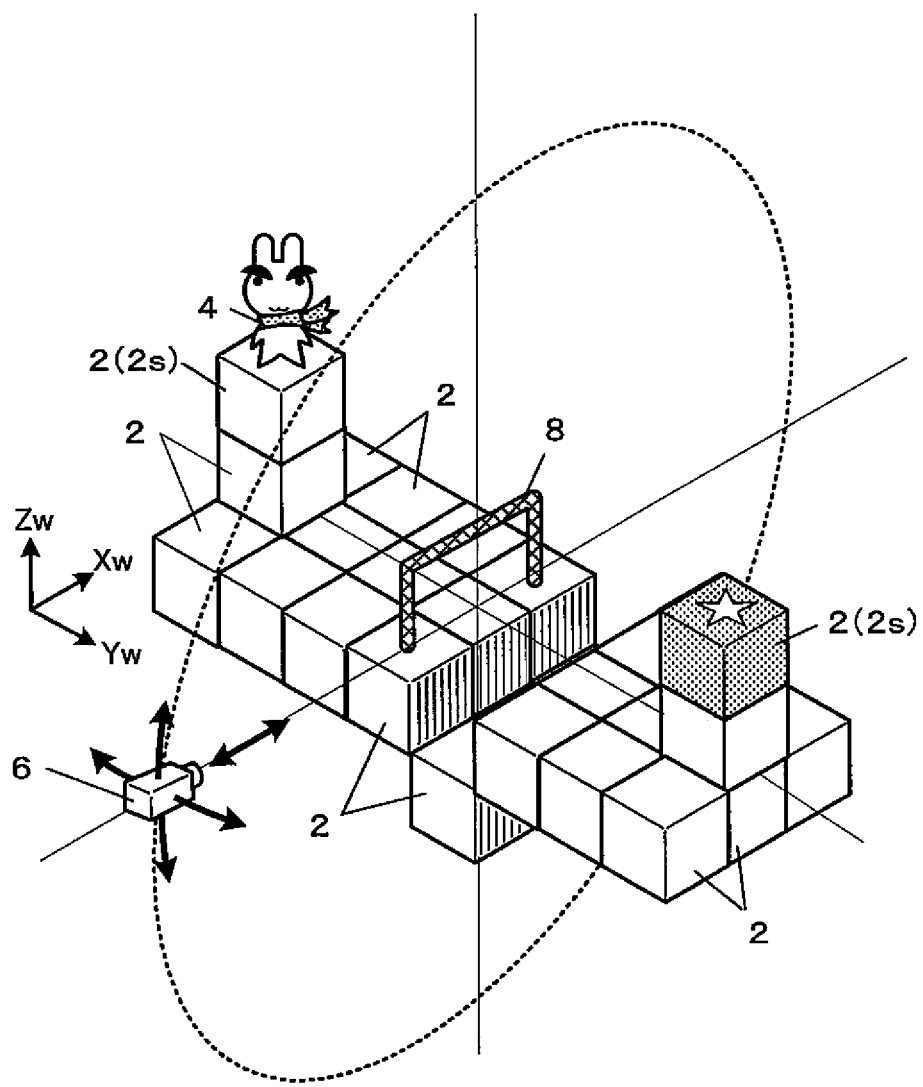
FIG. 3 is a perspective view illustrating a virtual three-dimensional space as a configuration example of a game space.

FIG. 3 is a perspective view illustrating a virtual three-dimensional space as a configuration example of the game space. The video game according o the first embodiment is a puzzle game. The puzzle game space is formed by arranging and stacking a plurality of cubes 2 (cubic objects) in the virtual three-dimensional space (three-dimensional CG space), A player character 4 that can move over the disposed cubes 2, and a virtual camera 6 are disposed in the virtual three-dimensional space. A game screen (image) is generated and displayed by rendering an image inside the virtual three-dimensional space that has been photographed by the virtual camera 6. The following description is given taking an example in which the player character 4 is moved (operated) by the player. Note that the player character 4 may be automatically moved(operated) by AI control. The player can arbitrarily change the position and the posture of the virtual camera 6 within the range in which the virtual camera 6 looks down on the game space.

Figure 4:
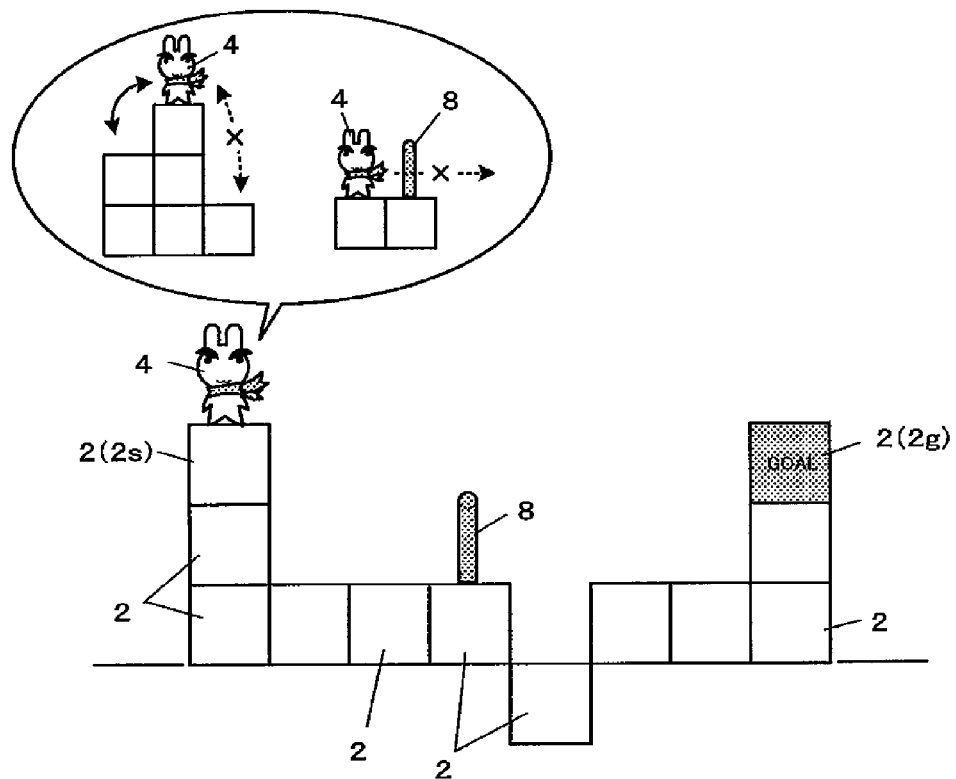
FIG. 4 is a view (side view of a game space) illustrating the rules of a game.

The rules of the game are described below with reference to FIGS. 3 and 4. Note that FIG. 4 is a view (side view of the game space) illustration the rules of the game.

A start point 2 (2s) and a goal point 2 (2g) are set in the game space in advance, The player character 4 is disposed at the start point 2 (2s) when the game has started. The player wins (clears) the game when the player has moved the player character 4 to the goal point 2 (2g). The player character 4 cannot move when no difference in height is present. The player character 4 can move when the difference in height corresponds to the height of one cube 2, but cannot move when the difference in height corresponds to the total height of two or more cubes 2. The player character 4 cannot move forward when a gap or an obstacle 8 is present. The player cannot move the player character 4 to the goal point 2 (2g) in the initial cube arrangement state. Therefore, the player proceeds with the game while changing the position of each cube 2 (changing the geography) so that the player character 4 can move to the goal point 2 (2g). Specifically, the player solves the puzzle by rearranging the cubes 2.

Figure 5:
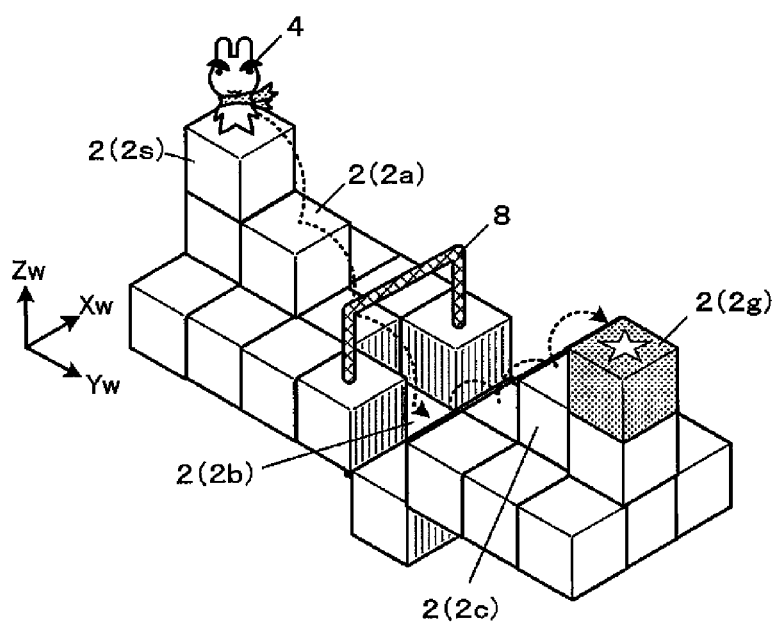
FIG. 5 is a perspective view illustrating a game space that shows an example solution to a puzzle.

FIG. 5 is a perspective view illustrating the game space that shows an example solution to the puzzle. A path (see the dotted arrow) that changes in height difference by the height of one cube 2 is formed between the start point 2 (2s) and the goal point 2 (2g) by moving the cube 2 (2a) adjacent to the start point 2 (2s) upward by one step, moving the center cube 2 (2b) under the obstacle 8 downward by one step, and moving the cube 2 (2c) adjacent to the goal point 2 (2g) upward by one step. The player wins (clears) the game when the player has moved the player character 4 along the above path.

Operation Method

A cube rearrangement operation is described below.

The first embodiment implements an operation feel as if to press the cube 2 displayed on the touch panel 1506 up or down with a finger or like. More specifically, the player can move the cube 2 downward by performing a touch operation on the touch panel 1506, and can move the cube 2 upward by performing a touch operation on the rear touch pad 1508.

As illustrated in FIG. 6 (see (1)), when the player has touched the touch panel 1506 with a finger or the like in a state in which the game space is displayed on the touch panel 1506, a pointing icon 12 is displayed at the touch position. When the player has slid the finger or the like without removing the finger or the like from the touch panel 1506, the pointing icon 12 moves along with the movement of the touch position. It is detected that the cube 2 (2h) that is situated at the position at which the pointing icon 12 is displayed is selected, and the cube 2 is highlighted to indicate that it is selected. FIG. 6 illustrates an example in which the contour of the cube 2 (2b) is highlighted. Note that the cube 2 (2b) may be highlighted by changing the display state from a normal display state (e.g., changing the luminance of the surface of the cube).

When the player has removed the finger or the like from the touch panel 1506 in a state in which the cube 2 is selected, and immediately touched the touch panel 1506 so as to select the same cube 2 (see (2) in FIG. 6), the selected cube 2 (2b) is moved downward by the height of one cube (see (3) in FIG. 6), Specifically, the player can moved the desired cube 2 downward by sliding the finger or the like while touching the touch panel 1506 to select the desired cube, removing the finger or the like from the touch panel 1506 (suspending the touch operation), and again touching the touch panel 1506 as if to press the cube downward.

When the player has touched the cube 2 that is not situated at the position at which the pointing icon 12 is displayed, it is determined that the player has selected another cube (i.e., the cube is not moved downward).

FIG. 7 is a view ((1): front view, (2): rear view) illustrating an operation that moves the cube 2 upward. In the rear view (2) in FIG. 7, the image displayed on the front side is perspectively displayed using dotted lines for convenience of illustration. When the player has touched the rear touch pad 1508 with a finger or the like, and slid the finger or the like without removing the finger or the like from the rear touch pad 1508, the pointing icon 12 moves within the game screen displayed on the touch panel 1506 corresponding to the slide operation performed on the rear touch pad 1508.

In this ease, a position detection effective range 16 is set within the original detection range of the rear touch pad 1508 (i.e., the entire surface of the rear touch pad 1508), and the pointing icon 12 is controlled (displayed) corresponding to the touch position within the effective range 16. Therefore, a position 18 at which the player actually touches the rear touch pad 1508 with a finger or the like does not necessarily coincide with the position at which the pointing icon 12 is displayed.

The effective range 16 is set to a center area of the original detection range of the rear touch pad 1508 so that the fingers that hold (support) the back side of the main body 1501 are not positioned within the effective range 16 (see (1) and (2) in FIG. 8).

For example, when the player performs a menu selection operation or the like before starting the game, the player holds the game device 1500 with both hands while placing the thumbs on the front side of the game device 1500 so that the player can operate the arrow key 1502 and the button switches 1504 provided on the front side of the game device 1500, and holding (touching) the back side of the game device 1500 with the remaining fingers. Each almost stationary touch position (i.e., each shaded elliptical range in (2) in FIG, 8) detected by the rear touch pad 1508 is detected on each side, and the effective range 16 is set at a center position at a given distance $\Delta X$ from the detected almost stationary touch position. In order to set the relationship between the effective range 16 and the touch panel 1506, a transformation matrix is generated so that the four corners of the effective range 16 respectively correspond to the four corners of the touch panel 1506 (see (3) in FIG. 8). A touch position subsequently detected within the effective range 16 is transformed using the transformation matrix, and set as the display position of the pointing icon 12 within the display screen.

When the player has adjusted the touch position on the rear touch pad 1508 while observing the position of the pointing icon 12 within the game screen so that the pointing icon 12 moves to the desired cube 2 (2a), the cube 2 at the position at which the pointing icon 12 is displayed is detected to be in a selected state, and highlighted. When the player has removed the finger or the like from the rear touch pad 1508 in a state in which the cube 2 (2a) is selected, and immediately retouched the same position (see (1) in FIG. 9), the selected cube 2 (2a) is moved upward by the height of one cube (see (2) in FIG. 9). Specifically the player can move the desired cube 2 upward by selecting the cube by touching the rear touch pad 1508, removing the finger from the rear touch pad 1508, and performing a retouch operation so as to select the cube as if to press the cube upward.

The upward operation is an operation input that requires a retouch to the touch cancellation position, and utilizes the rear touch pad 1508. Therefore, the retouch position may be easily shifted from the touch cancellation position as compared with the downward operation that utilizes the touch panel 1506. In the first embodiment, a retouch determination area 22 for determining that the player has retouched the touch cancellation position is provided in order to allow such a shift.

Figure 10:
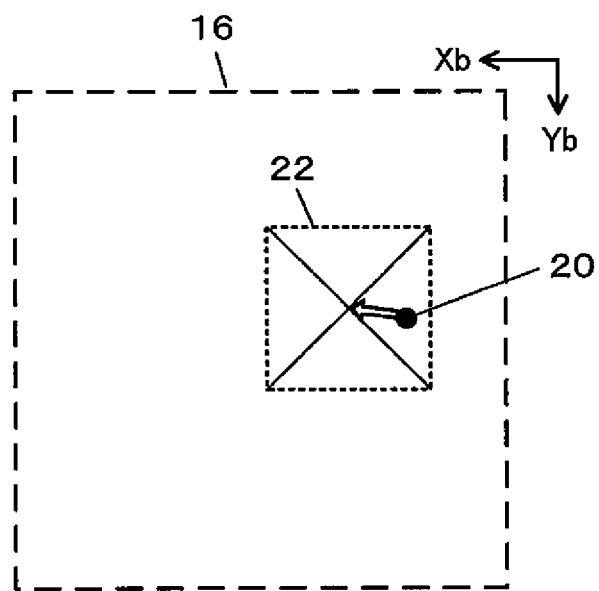
FIG. 10 is a view illustrating a retouch determination area according to the first embodiment.

As illustrated in FIG. 10, the touch position when touch cancellation has been detected is stored as a touch cancellation position 20, and the retouch determination area 22 that allows a shift is set using the touch cancellation position 20 as a reference point. It is determined that the player has retouched the touch cancellation position when it has been detected that the player has touched the retouch determination area 22 within a given time limit from the touch cancellation tinting, and the cube 2 is moved. It is determined that the player desires to select another cube when the player has not touched the retouch determination area 22 within the given time limit from the touch cancellation timing. In this case, the pointing icon 12 is moved without moving the cube 2.

The shape and the size of the retouch determination area 22, and the relative position of the retouch determination area 22 with respect to the touch cancellation position 20 may be appropriately set.

The shape of the retouch determination area 22 may be appropriately selected from an elliptical shape, a rectangular shape, a shape similar to the shape of the surface of the displayed cube 2 that faces the virtual camera 6, and the like. In the first embodiment, the retouch determination area 22 is set to have a rectangular shape.

The size of the retouch determination area 22 may be set to a given value. In the first embodiment, the finger size of the player is estimated from the touch area when the player has performed the touch operation, and the size of the retouch determination area 22 is set corresponding to the estimated finger size. The touch area when the player has performed the touch operation may be the average touch area when determining the almost stationary touch position when setting the effective range 16, or may be determined by taking statistics of the average touch area of each touch operation after the game has started. The touch area may be calculated by appropriately utilizing known technology.

The relative position of the retouch determination area 22 with respect to the touch cancellation position 20 may be set to a given value. In the first embodiment, statistics of the shift amount and the shift direction between the touch cancellation position 20 and the retouch position are taken (synonymous with determination of shift tendency) after the game has started, and the retouch determination area 22 is set at a position offset from the touch cancellation position 20 (see the white arrow in FIG. 10) so as to absorb the shift tendency.

The example illustrated in FIG. 10 means that the player tends to retouch the touch cancellation position 20 at a position offset from the touch cancellation position 20 to the left when viewed from the back side.

Note that the retouch determination area 22 is set when the player has cancelled the touch operation on the rear touch pad 1508, and is also set when the player has cancelled the touch operation on the touch panel 1506. However, since the player can perform the touch operation on the touch panel 1506 while observing the touch panel 1506, the retouch determination area 22 is set to have a size that is almost equal to the display size of the cube 2 when the player has cancelled the touch operation on the touch panel 1506.

Functional Blocks

A functional configuration that implements the first embodiment is described below.

Figure 11:
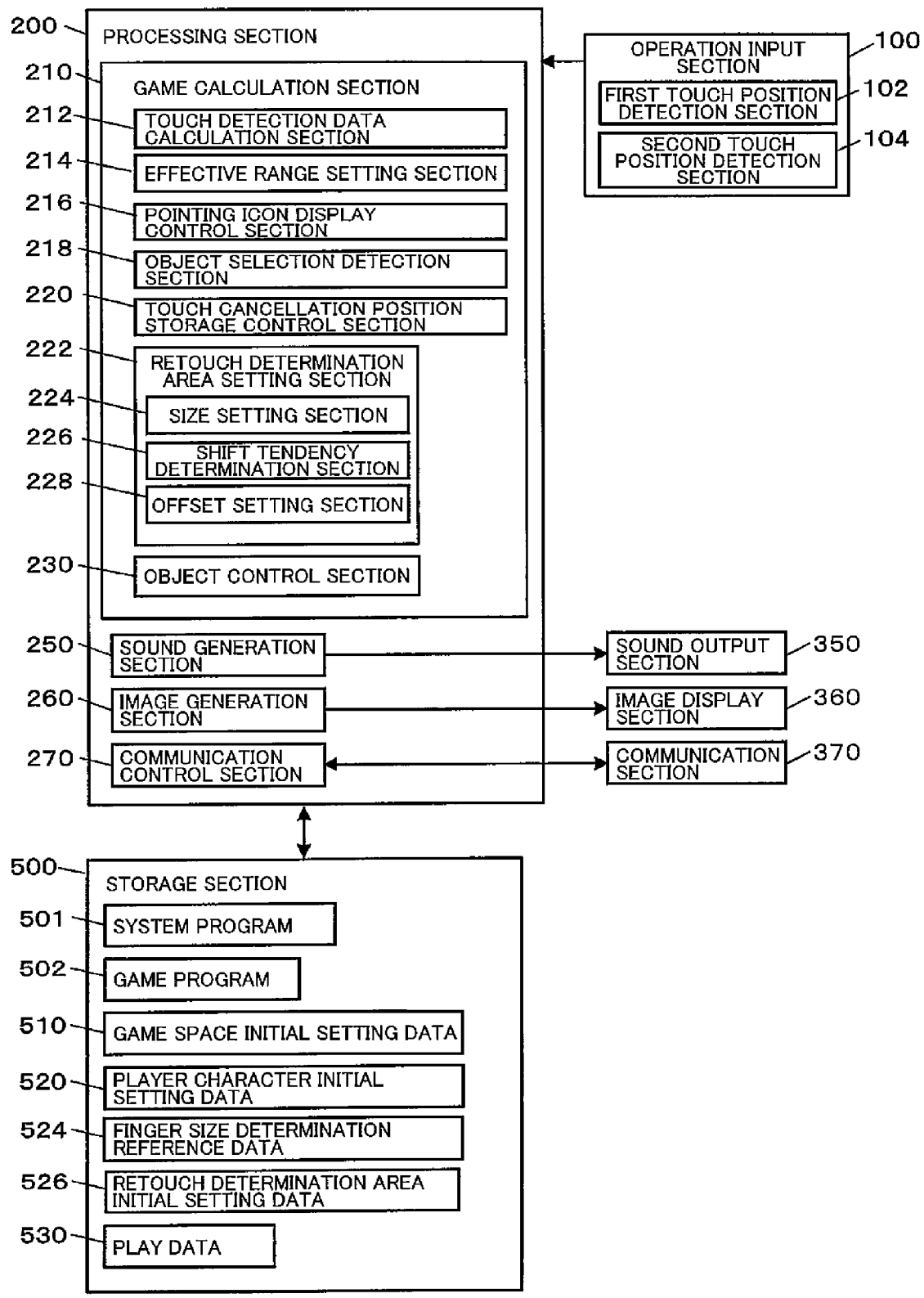
FIG. 11 is a functional block diagram illustrating a functional configuration example of a game device according to the first embodiment.

FIG. 11 is a functional block diagram illustrating an example of a functional configuration of the game device 1500 according to the first embodiment. As illustrated in FIG. 11, the game device 1500 includes an operation input section 100, a processing section 200, a sound output section 350, an image display section 360, a communication section 370, and a storage section 500.

The operation input section 100 outputs an operation input signal to the processing section 200 based on an operation input performed by the player. For example, the operation input section 100 may be implemented by an element that is operated directly by the player with a finger (e.g., button switch, joystick, touch pad, or trackball), an element that detects motion or posture (e.g., acceleration sensor, angular velocity sensor, tilt sensor, or terrestrial magnetism sensor), or the like. The arrow key 1502 and the button switches 1504 illustrated in FIG. 1 correspond to the operation input section 100.

The operation input section 100 includes a first touch position detection section 102 and a second touch position detection section 104 that detect a position input performed on the operation surface. The first touch position detection section 102 corresponds to the touch panel 1506 illustrated in FIG. 1, and the second touch position detection section 104 corresponds to the rear ouch pad 1508 illustrated in FIG. 2.

The processing section 200 is implemented by electronic parts such as a microprocessor (e.g., CPU and GPU), an ASIC, and an IC memory. The processing section 200 exchanges data with (controls data exchange between) each functional section, and performs a calculation process based on a given program, data, the operation input signal from the operation input section 100, and the like to control the operation of the game device 1500. The control board 1550 illustrated in FIG. 1 corresponds to the processing section 200. The processing section 200 includes a game calculation section 210, a sound generation section 250, an image generation section 260, and a communication control section 270.

The game calculation section 210 performs a control process necessary for executing the game according to the first embodiment. For example, the game calculation section 210 performs (1) a process that disposes a plurality of cubes (objects) 2 in the virtual three-dimensional space to form a game space, (2) a process that disposes the player character 4 in the game space, and controls the movement of the player character 4 based on the operation input signal from the operation input section 100, (3) a process that controls the movement of the cube 2 based on the operation input signal from the operation input section 100, (4) a process that manages play data that indicates the game status, (5) a process that detects whether or not game end conditions have been satisfied, and (6) a game space image display process that controls the movement and the posture of the virtual camera 6 that photographs the game space, and performs a control process that displays the object on the display device, and the like.

The game calculation section 210 also appropriately performs a timing process (e.g., time limit management process) that utilizes a system clock signal, a flag management process, and the like.

The game calculation section 210 includes a. touch detection data calculation section 212, an effective range setting section 214, a pointing icon display control section 216, an object selection detection section 218, a touch cancellation position storage control section 220, a retouch determination area setting section 222, and an object control section 230.

The touch detection data calculation section 212 calculates touch detection data based on the operation input signal from the first touch position detection section 102 and the second touch position detection section 104. For example, the touch detection data calculation section 212 calculates the touch position coordinates, the touch area, and the moving speed of the touch position.

The effective range setting section 214 performs a process that sets the touch operation detection effective range (effective range 16) within the detection range of the second touch position detection section 104 (rear touch pad 1508). More specifically, the effective range setting section 214 determines the touch position of each finger that holds the main body from a change in moving speed of each touch position, and sets the effective range 16 on the center side with respect to the determined touch position. The effective range setting section 214 calculates the transformation matrix for linking the position within the effective range 16 to the position within the screen range of the image display section 360 so that the effective range 16 corresponds to the entire screen of the image display section 360.

The pointing icon display control section 216 displays the pointing icon 12 within the screen corresponding to the first touch position on the first touch position detection section 102 and the second touch position detection section 104.

The object selection detection section 218 detects that one cube (object) among a plurality of cubes (objects) has been selected, and changes the display state of the selected cube (object) to notify the player that the cube (object) has been selected (when a touch operation has been performed) based on the positional relationship between the display position of the cube (object) on the display device (touch panel 1506) and the touch position on the touch-operated device (touch panel 1506 and rear touch pad 1508). In the first embodiment, the object selection detection section 218 detects that one of the objects of the plurality of cubes 2 that form the game space has been selected, and highlights the contour of the selected object. More specifically, the object selection detection section 218 determines the object of the cube 2 that corresponds to the display position of the pointing icon 12 to detect that the object has been selected.

The touch cancellation position storage control section 220 controls storage of the position (touch cancellation position 20) at which the touch operation has been canceled. Note that a touch when the object is selected may be stored depending on the selection operation method.

The retouch determination area setting section 222 performs a process that determines the shape, the size. and the position of the retouch determination area 22. In the first embodiment, the retouch determination area setting section 222 includes a size setting section 224, a shift tendency determination section 226, and an offset setting section 228.

The size setting section 224 determines whether to set the retouch determination area 22 to have a shape and a size corresponding to the display size (i.e., the size of the surface that faces the virtual camera 6) of the cube 2, or have a range that is larger than the display size of the cube 2 and includes the display size of the cube 2 based on the display size of the cube 2. More specifically, the size setting section 224 calculates the distance from the virtual camera 6 to the selected cube 2. The size setting section 224 may set the retouch determination area 22 to have a shape and a size corresponding to the display size of the cube 2 when the distance is equal to larger than a reference value, and may set the retouch determination area 22 to have a range that is larger than the display size of the cube 2 when the distance is less than the reference value. In the latter case, the size setting section 224 determines the size of the retouch determination area 22 corresponding to the touch area of each touch operation. In the first embodiment, the thickness of the finger of the player may be estimated from the touch area, and the size of the retouch determination area 22 may be set to a value suitable for the estimated thickness of the finger.

The size setting section 224 may set a front retouch determination area within the touch operation area of the front touch-operated device (first touch position detection section 102), and may seta rear retouch determination area that is larger than the front retouch determination area within the touch operation area of the rear touch-operated device (second touch position detection section 104). Specifically, since the player can operate the front touch-operated device while observing the front touch-operated device, the player can easily retouch almost the same position. If the size of the front retouch determination area is unnecessarily increased, it may be determined that the player has retouched the front touch-operated device even if the retouch position is clearly shifted.

The shift tendency determination section 226 calculates the shift amount between the touch cancellation position 20 and the touch position (retouch position) that has been detected within a given time from the touch cancellation timing, and stores (manages) the history of the shift amount. The shift tendency determination section 226 calculates and determines the shift tendency. For example, the shift tendency determination section 226 calculates the statistical value (e.g., average value or median value) of the shift amount and the statistical value (e.g., average value or median value) of the shift direction.

The offset setting section 228 determines the offset direction and the offset amount of the retouch determination area 22 (that has been determined and set by the size setting section 224) with respect to the touch cancellation position 20 corresponding to the shift tendency that has been determined and calculated by the shift tendency determination section 226.

The object control section 230 determines that the selected object that has been detected by the selection detection section 218 has been selected again when the touch position after setting the retouch determination area 22 is within the determination area, and performs a given control process on the selected object. In the first embodiment, the selected object is moved downward when the player has touched the touch panel 1506, and is moved upward when the player has touched the rear touch pad 1508.

In the first embodiment, the moving direction of the object Is set as described above since the virtual camera 6 looks down on the game space. When the virtual camera 6 looks up at the game space (i.e., when the lower side of the game space can be photographed), the object may be moved in the direction along the line-of-sight direction of the virtual camera 6 when the player has touched the touch panel 1506, and may be moved in the direction opposite to the line-of-sight direction of the virtual camera 6 when the player has touched the rear touch pad 1508.

The sound generation section 250 is implemented by a. processor (e.g., digital signal processor (DSP) or sound synthesis IC) and an audio codec that can reproduce a sound file, for example. The sound generation section 250 generates sound signals of a game effect sound, background music (BGM), or an operation sound based on the processing results of the game calculation section 210, and outputs the generated sound signals to the sound output section 350.

The sound output section 350 is implemented by a device that outputs a game effect sound, BGM, a telephone voice, and the like based on the sound signals input from the sound generation section 250. The speaker 1510 illustrated in FIG. 1 corresponds to the sound output section 350.

The image generation section 260 is implemented by a processor (e.g., graphics processing unit (GPU) or a digital signal processor (DSP)), a video signal IC, a program (e.g., video codec), a drawing frame IC memory (e.g., frame buffer), a texture data IC memory, and the like. The image generation section 260 is involved in the process that displays the object on the display device. For example, the image generation section 260 generates a game screen (image) every frame (e.g., 1/60th of a second) based on the processing results of the game calculation section 210, and outputs an image signal of the generated game screen (image) to the image display section 360.

The image display section 360 displays a game image based on the image signal input from the image generation section 260. The image display section 360 may be implemented by an image display device such as a flat panel display, a cathode-ray tube (CRT), a projector, or a head-mounted display. The touch panel 1506 illustrated in FIG. 1 corresponds to the image display section 360.

The communication control section 270 performs a data communication connection process and a data communication process, and exchanges data with an external device via the communication section 370. The communication section 370 connects to the communication line 1 to implement communication. The communication section 370 may be implemented by a transceiver, a modem, a terminal adapter (TA), a jack for a communication cable, a control circuit, and the like. The wireless communication module 1553 illustrated in FIG. 1 corresponds to the communication section 370.

The storage section 500 stores a program, data, and the like that implement a function of causing the processing section 200 to integrally control the game device 1500. The storage section 500 is used as a work area for the processing section 200, and temporarily stores the results of calculations performed by the processing section 200 based on a program, data input from the operation input section 100, and the like. The function of the storage section 500 may be implemented by an IC memory (e.g., RAM and ROM), a magnetic disk (e.g., hard disk), an optical disk (e.g., CD-ROM and DVD), and the like. The IC memory 1552 included in the control board 1550 and the memory card 1540 illustrated in FIG. I correspond to the storage section 500. The storage section 500 may be partly implemented by an external storage that can be accessed through the communication line 1.

In the first embodiment, the storage section 500 stores a system program 501 and a game program 502. The system program 501 implements the basic functions of the game device 1500 (computer). The game program 502 causes the processing section 200 to implement the function of the game calculation section 210. In the first embodiment, the game program 502 is stored in the memory card 1540 (see FIG. 1)

in advance. Note that the game program 502 may be downloaded from a given server before starting the game.

The storage section 500 stores game space initial setting data 510, player character initial setting data 520, finger size determination reference data 524, and retouch determination area initial setting data 526 in advance. The game space initial setting data 510, the player character initial setting data 520, the finger size determination reference data 524, and the retouch determination area initial setting data 526 are stored in the memory card 1540 in advance. Note that the game space initial setting data 510, the player character initial setting data 520, the finger size determination reference data 524, and the retouch determination area initial setting data 526 may he downloaded from a given server before starting the game. The storage section 500 also stores play data 530 that is generated during the game, and updated at any time. The storage section 500 also appropriately stores data necessary when performing each process (e.g., decompressed texture data, elapsed time, timer value, counter value, and flag).

Figure 12:
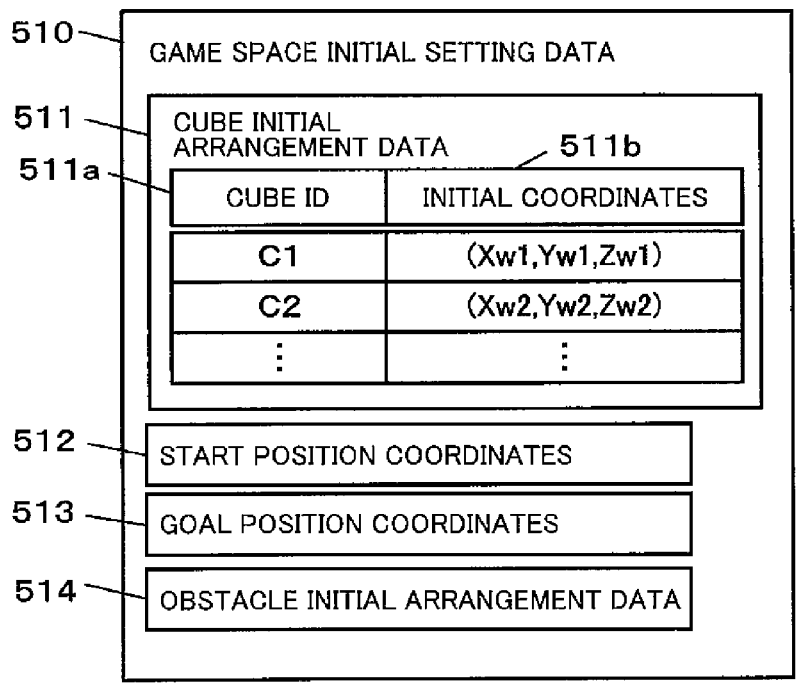
FIG. 12 is a view illustrating a data configuration example of game space initial setting data.

The game space initial setting data 510 is initial setting data that defines a space that forms the stage of the game. As illustrated in FIG. 12, the game space initial setting data 510 includes cube initial arrangement data 511 that defines the arrangement state of the cube 2, start position coordinates 512, goal position coordinates 513, and obstacle initial arrangement data 514, for example. The cube initial arrangement data 511 includes a cube ID 511a and initial coordinates 511b in the virtual three-dimensional space.

Figure 13:
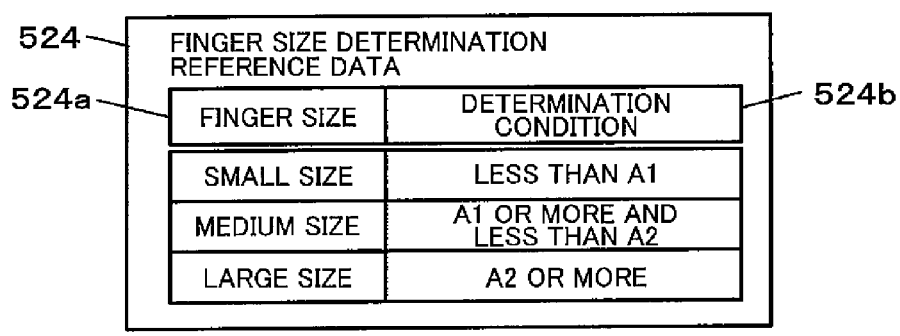
FIG. 13 is a view illustrating a data configuration example of finger size determination reference data.

The finger size determination reference data 524 is reference data for determining the finger size of the player. As illustrated in FIG. 13, the finger size determination reference data 524 includes a finger size 524a and an average touch area determination condition 524b (i.e., a condition whereby the finger size is determined to be the corresponding size), for example.

The retouch determination area initial setting data 526 includes various initial setting parameters of the retouch determination area 16. As illustrated FIG. 14, the retouch determination area initial setting data 526 includes an application target 526a, a finger size 526b, a basic shape 526c, and an area size 526d, for example.

The finger size 526b corresponds to the finger size defined by the finger size determination reference data 524. The basic shape 526c may be appropriately set. In the first embodiment, the retouch determination area 22 for the touch panel 1506 is set to have a shape similar to the shape of the surface of the displayed cube 2 that faces the virtual camera 6 the shape observed by the player), and the retouch determination area 22 for the rear touch pad 1508 is set to have a square shape. Note that the retouch determination area 22 may be set to have an elliptical shape or another polygonal shape.

The area size 526d may also be appropriately set. In the first embodiment, when setting the retouch determination area based on the touch operation performed on the touch panel 1506, the retouch determination area is set so that the representative dimensions of the basic shape are equal to the display width of the upper side of the cube 2. When setting the retouch determination area based on the touch operation performed on the rear touch pad 1508, the retouch determination area is set on that the retouch determination area set for the rear touch pad 1508 is larger than the retouch determination area set for the touch panel 1506, and the representative dimensions of the basic shape increase as the finger size 526b increases (i.e., the area increases as the size of the finger or the like increases).

Figure 15:
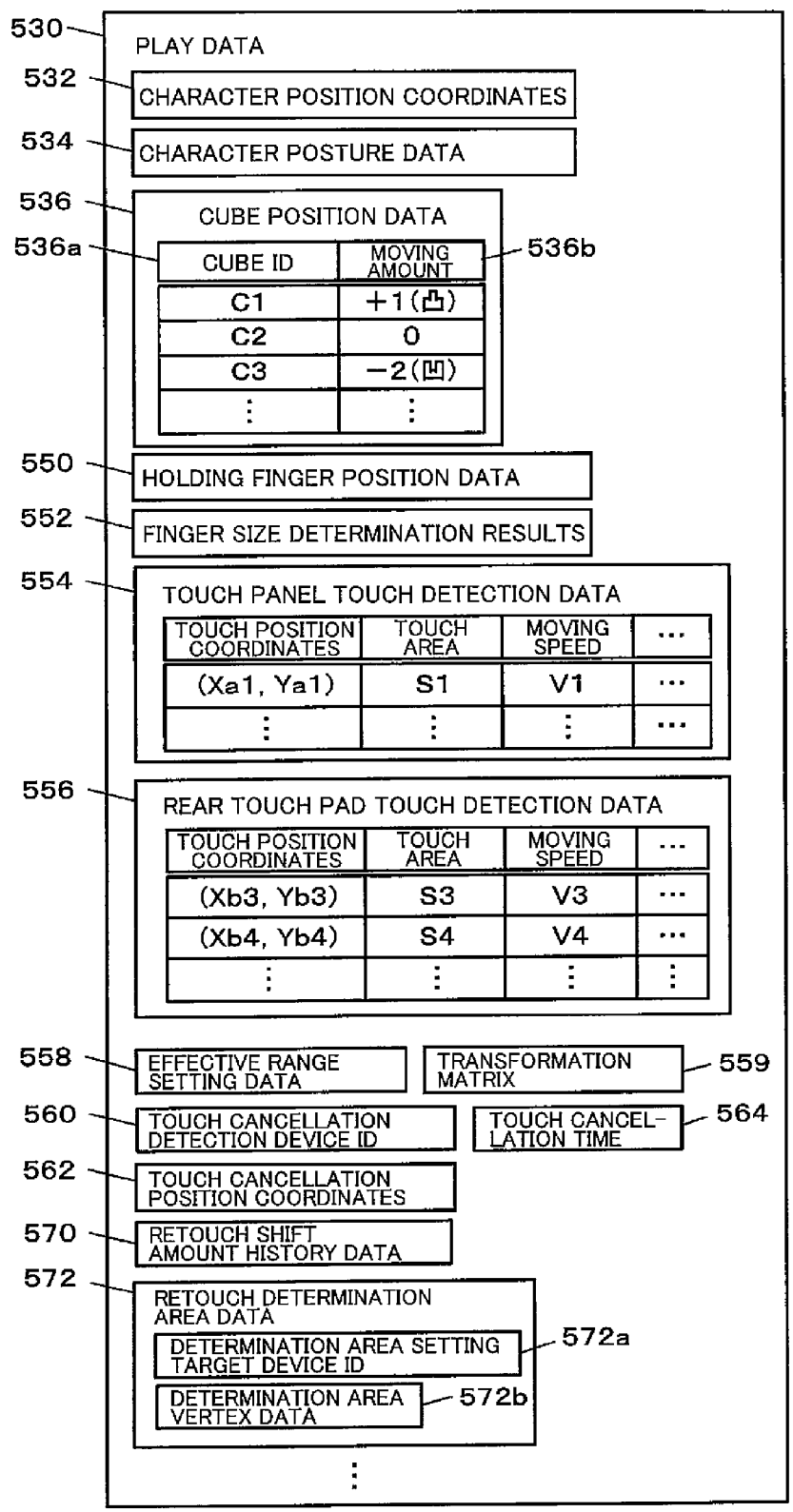
FIG. 15 is a view illustrating a data configuration example of play data according to the first embodiment.

Note that the enlargement factor of the area size 526d may be appropriately set The play data 530 includes data that indicates the game status. As illustrated in FIG. 15, the play data 530 includes character position coordinates 532 in the game space character posture data 534, and cube position data 536, for example. The cube position data 536 includes a cube ID 536a, and a moving amount 536b that indicates the vertical moving amount of the cube from the initial position.

The play data 530 also includes holding finger position data 550, finger size determination results 552, touch panel touch detection data 554, rear touch pad touch detection data 556, effective range setting data 558, a transformation matrix 559 that transforms the effective range coordinate system into the screen coordinate system, a touch cancellation detection device ID 560, touch cancellation position coordinates 562, a touch cancellation time 564. retouch shift amount history data 570, and retouch determination area data 572 as touch operation-related information.

The holding finger position data 550 indicates the touch position of each finger that holds the main body of the game device 1500. An operation input that has been performed at the position that has been registered as the holding finger position data 550 is not considered to be an operation input during the game.

The touch panel touch detection data 554 and the rear touch pad touch detection data 556 indicate the parameter value at each touch position detected by the touch panel 1506 and the rear touch pad 1508, respectively. For example, the touch position coordinates, the touch area, and the moving speed are stored as the touch panel touch detection data 554 and the rear touch pad touch detection data 556 in order of detection.

The effective range setting data 558 defines the effective range 16 (see FIG. 8). For example, the coordinates of the four corners of the effective range 16 in the detection coordinate system of the rear touch pad 1508 are stored as the effective range setting data 558. The transformation matrix 559 is a matrix that transforms the position within the effective range 16 into the position in the screen coordinate system.

The touch cancellation detection device ID 560 indicates identification information about the device that has detected the touch cancellation operation. In the first embodiment, the ID of the touch panel 1506 or the rear touch pad 1509 is stored as the touch cancellation detection device ID 560. A flag that indicates the touch panel 1506 or the rear touch pad 1509 may be stored as the touch cancellation detection device ID 560.

The coordinates within the effective range 16 of the touch panel 1506 or the rear touch pad 1508 at which the touch operation has been cancelled are stored as the touch cancellation position coordinates 562.

The touch cancellation time 564 indicates the system clock value when touch cancellation has been detected (the system clock value is always counted by the processing section 200), for example.

The retouch shift amount history data 570 indicates a given number of shift amounts between the touch cancellation position and the retouch position after the game has started.

The retouch determination area data 572 defines the retouch determination area 22 (see FIG. 10). For example, the retouch determination area data 572 includes a determination area setting target device ID 572a that indicates the touch panel 1506 or the rear touch pad 1508 to which the retouch determination area 22 has been set, and determination area vertex data 572b that defines the profile of the retouch determination on area 22.

Process Flow

The flow of each process according to the first embodiment is described below with reference to FIGS. 16 to 19. Each process is implemented by causing the game device 1500 to read the system program 501, the game program 502, and the setting data, and execute the system program 501 and the game program 502. Note that the game sound and the game screen may be generated and output in the same manner as in a known video game (description thereof is omitted).

Figure 16:
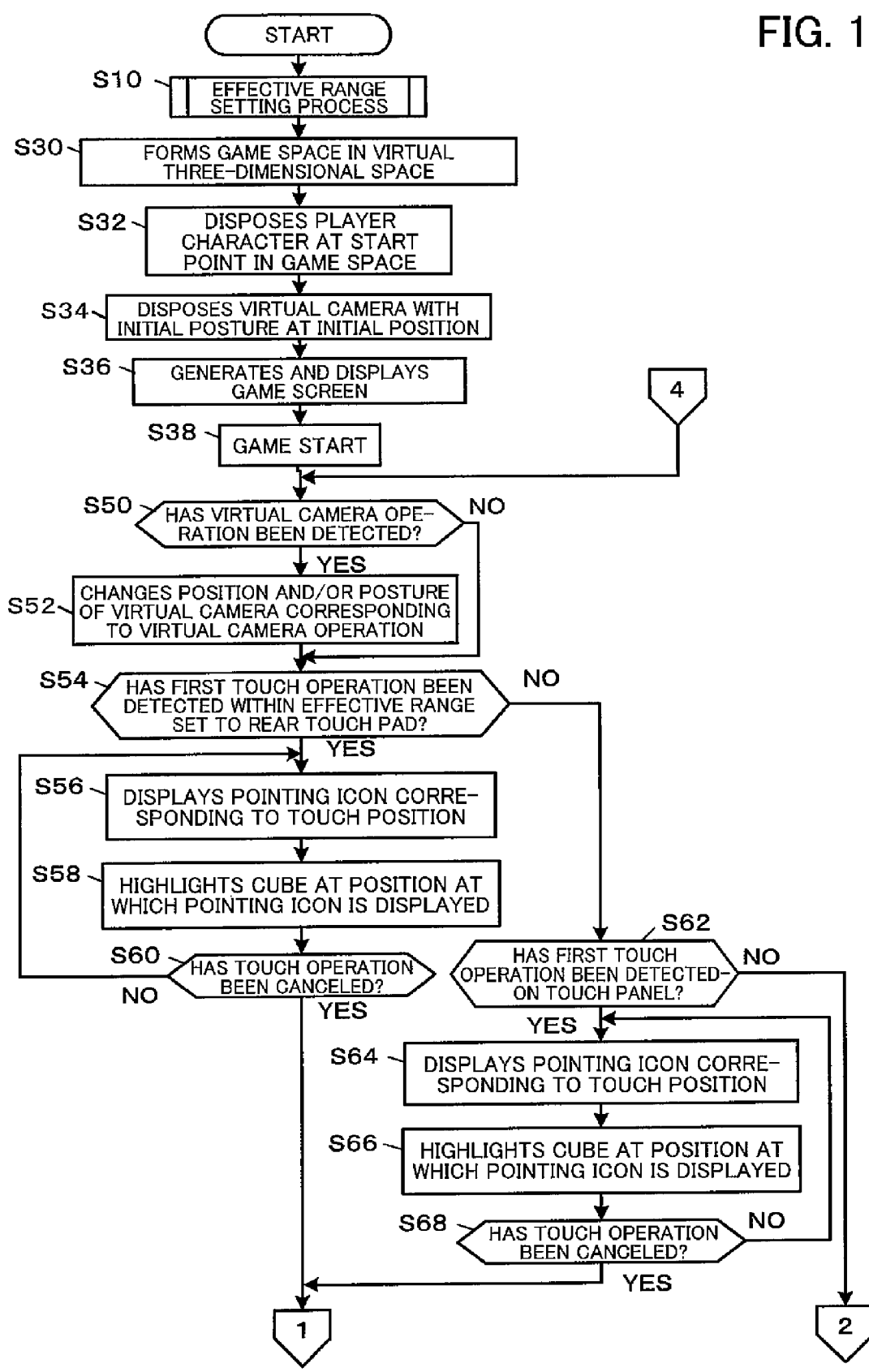
FIG. 16 is a flowchart illustrating the flow of the main process according to the first embodiment.
Figure 17:
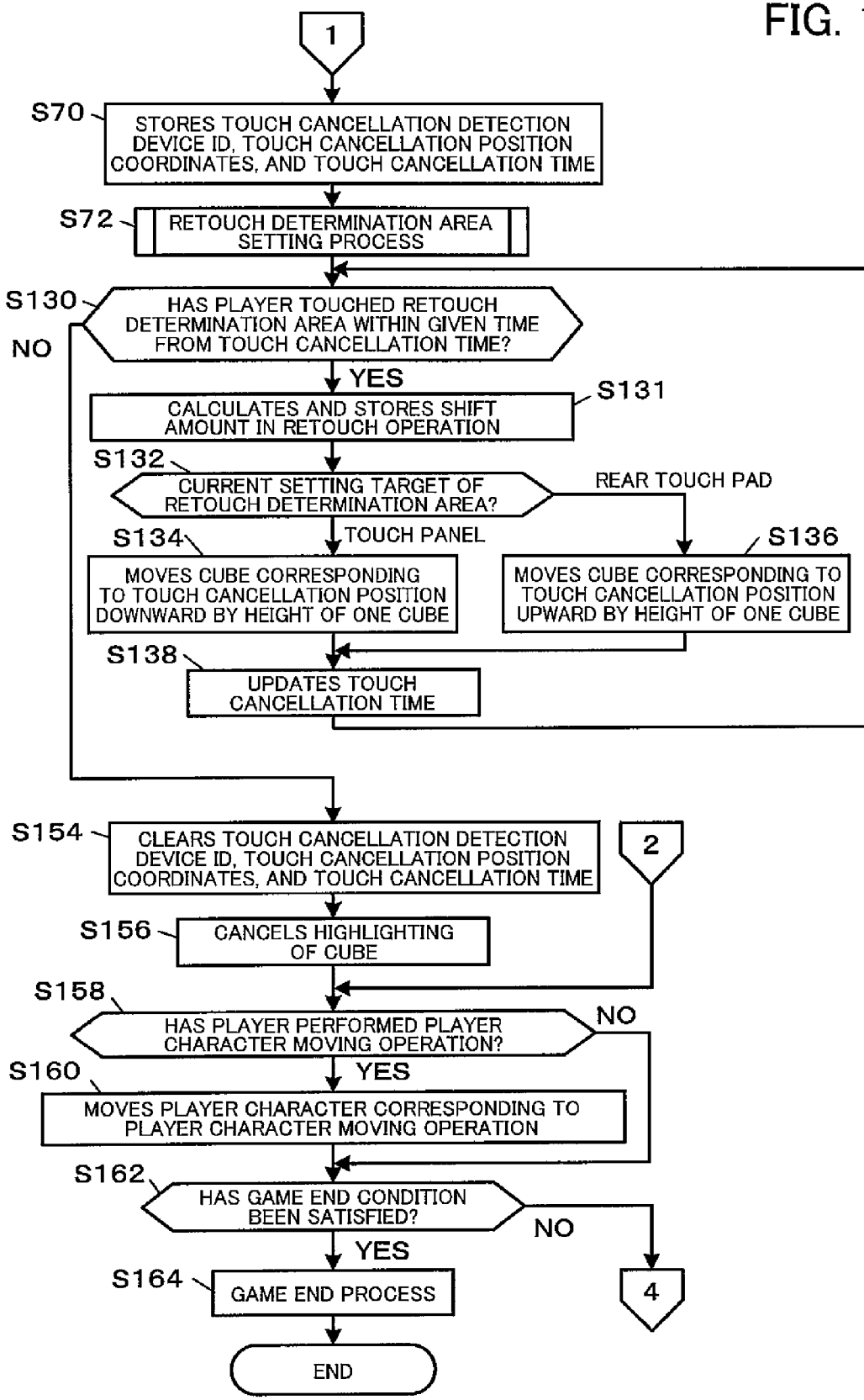
FIG. 17 is a flowchart that follows FIG. 16.

FIGS. 16 and 17 are flowcharts illustrating the flow of the main process according to the first embodiment. The processing section 200 performs an effective range setting process when the player holds the game device 1500 with both hands (or in a play state) (step S10).

Figure 18:
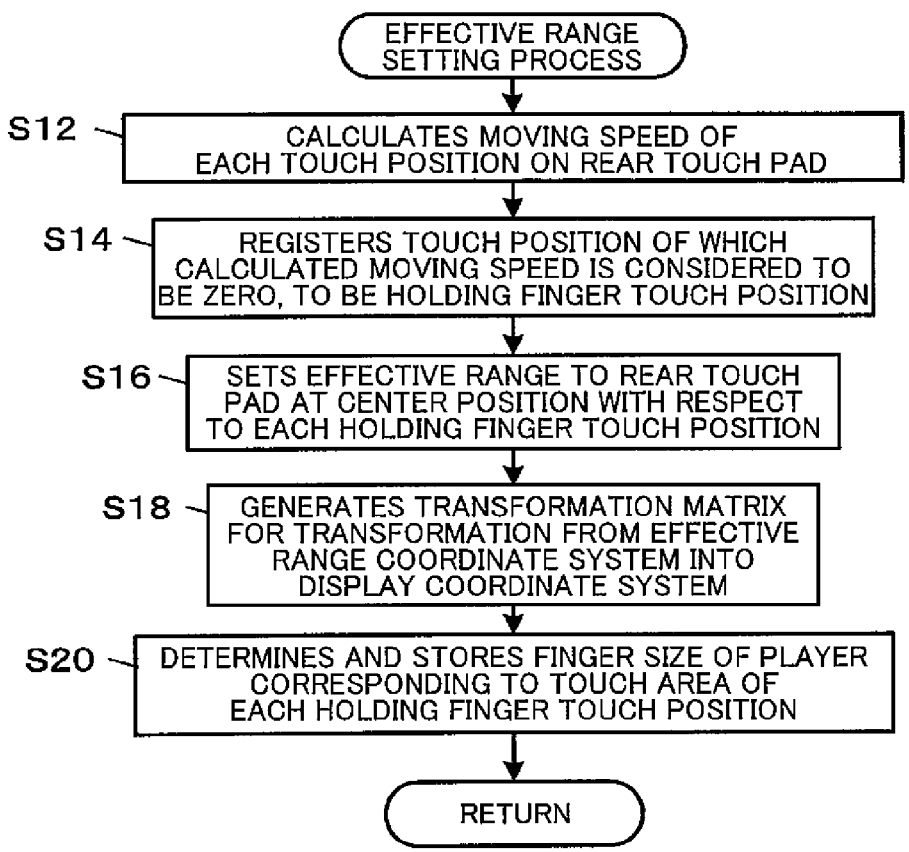
FIG. 18 is a flowchart illustrating the flow of an effective range setting process.

FIG. 18 is a flowchart illustrating the flow of the effective range setting process according to the first embodiment. The processing section 200 detects each touch position on the rear touch pad 1508, and calculates the moving speed of each touch position by tracking each touch position (step S12). The processing section 200 determines the touch position of which the calculated moving speed is lower than a reference value, to be the touch position of a finger that holds the main body, and registers the determined touch position as the holding finger position data 550 (see FIG. 15) (step S14).

The processing section 200 sets the effective range 16 to the rear touch pad 1508 at a center position with respect to each registered holding finger touch position, and stores the effective range setting data 558 as the play data 530 (step S16). More specifically, the processing section 200 classifies the holding finger touch positions depending on the position on the rear touch pad 1508, and sets a center-side position at a given distance from each center-side holding finger touch position to be each edge of the effective range 16.

The processing section 200 generates the transformation matrix 559 for transformation from the effective range coordinate system into the display coordinate system of the touch panel 1506, and stores the transformation matrix 559 as the play data 530 (step S 18).

The processing section 200 then calculates the touch area of each registered holding finger touch position, and determines the finger size of the player according to the finger size determination reference data 524 (see FIG. 13). More specifically, the processing section 200 compares the average touch area of each holding finger touch position with the determination condition 524b stored as the finger size determination reference data 524 to determine the finger size of the player. The processing section 200 stores the finger size determination results 552 as the play data 530 (step S20; see FIG. 15) to complete the effective range setting process.

Again referring to the flowchart illustrated in FIG. 16, the processing section 200 performs a game start preparation process. Specifically, the processing section 200 disposes a plurality of cubes 2 (objects) in the virtual three-dimensional space referring to the game space initial setting data 510 to form a game space (step S30), and disposes the player character 4 at a given start point 2 (2s) (step S32). The processing section 200 disposes the virtual camera 6 with the initial posture at the initial position (step S34), renders a game space image photographed by the virtual camera 6, and generates and displays the game screen using the game space image (step S36). The processing section 200 then starts the game (step S38).

When the processing section 200 has detected a virtual camera operation that changes the position and/or the posture of the virtual camera 6 (step S50), the processing section 200 changes the position and/or the posture of the virtual camera 6 corresponding to the operation (step S52). The player can thus display the game space at the desired angle and enlargement factor.

When the first touch position has been detected within the effective range 16 set to the rear touch pad 1508 during the game (YES in step S54), the processing section 200 tracks the first touch position, and disposes and moves the pointing icon 12 in the game space corresponding to the touch position (step S56). In this case, the coordinates of the first touch position detected by the rear touch pad 1508 a transformed using the transformation matrix 559.

The processing section 200 determines that the cube 2 corresponding to the position of the pointing icon 12 is selected, and highlights the selected cube 2 (step S58). The processing section 200 continue to display the pointing icon 12 and highlight the selected cube 2 until the touch operation is canceled (NO in step S60).

The pointing icon 12 corresponding to the touch position is thus displayed to move on the upper side of the cube 2, and the player can determine the cube 2 that is selected as the operation target. The player can select the desired cube 2 even if the player cannot observe the position of a finger or the like that touches the back side of the game device 1500 (see FIG. 7).

When the first touch position has been detected by the touch panel 1506 during the game (YES in step S62), the processing section 200 disposes and moves the pointing icon 12 corresponding to the touch position on the touch panel 1506 (step S64), determines that the cube 2 corresponding to the position of the pointing icon 12 is selected, and highlights the selected cube 2 (step S66). The processing section 200 continue to display the pointing icon 12 and highlight the selected cube 2 based on the touch operation performed on the touch panel 1506 until the touch operation is canceled (NO in step S68).

When the player has touched the touch panel 1506 or the rear touch pad 1508 with a finger or the like, slid the finger or the like, and removed the finger or the like after confirming that the desired cube 2 is highlighted, the processing section 200 detects that the first touch operation has been canceled (YES in step S60 or YES in step S68), and stores the touch cancellation detection device ID 560, the touch cancellation position coordinates 562 within the effective range 16, and the touch cancellation time 564 (see FIG. 17) (step S70; see FIG. 15). The processing section 200 then performs a retouch determination area setting process (step S72).

Figure 19:
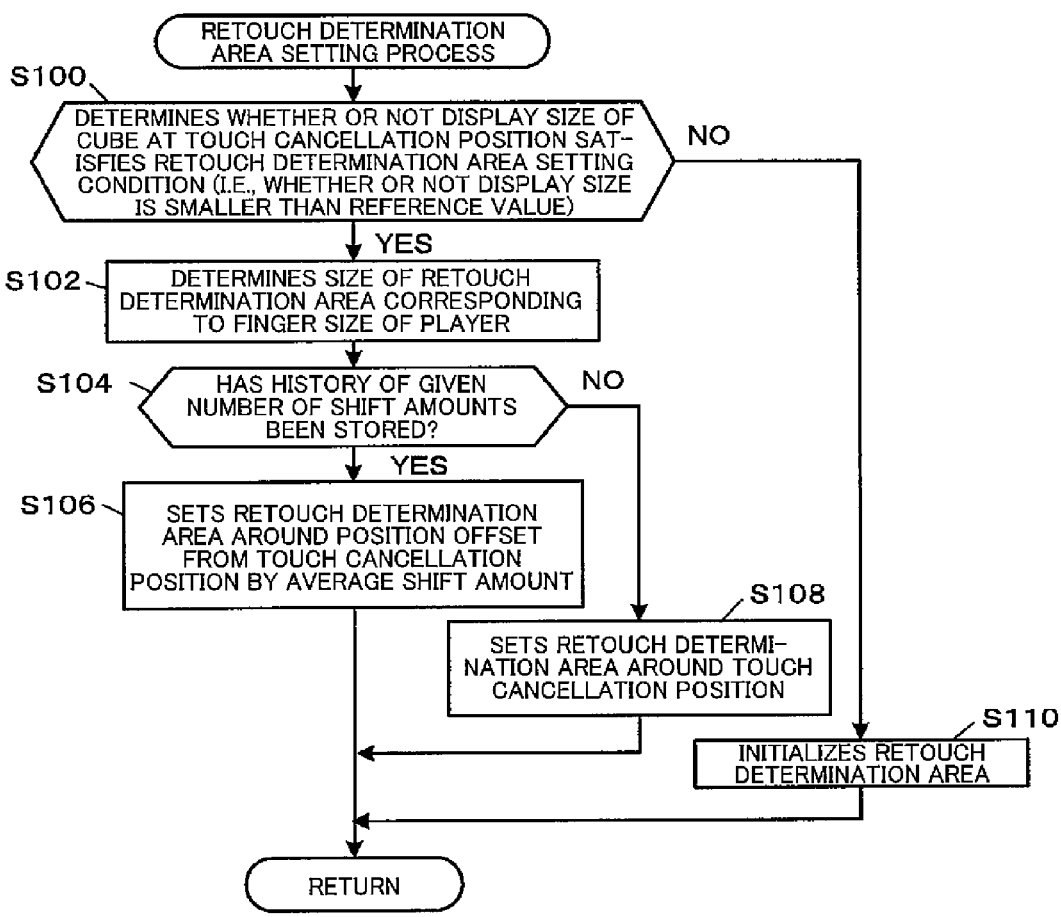
FIG. 19 is a flowchart illustrating the flow of a retouch determination area setting process.

FIG. 19 is a flowchart illustrating the flow of the retouch determination area setting process according to the first embodiment. The processing section 200 determines whether or not the display size of the cube 2 at the touch cancellation position satisfies a given retouch determination area setting condition (step S100), More specifically, the processing section 200 compares the distance from the virtual camera 6 to the cube 2 (highlighted cube 2) at the touch cancellation position with a reference value, and determines that the display size of the cube is small and requires retouch determination assistance (i.e., determines that, the display size of the cube 2 at the touch cancellation position satisfies the retouch determination area setting condition) when the distance is greater than the reference value. In other words, the processing section 200 determines whether to set the touch operation range corresponding to the display range of the cube 2 (object) selected based on the touch cancellation position 20 as the retouch determination area 22 (step S110), or set a range that is larger than the touch operation range and includes the touch operation range as the retouch determination area 22 (step S102).

When the processing section 200 has determined that the display size of the cube 2 at the touch cancellation position satisfies the retouch determination area setting condition (YES in step S100), the processing section 200 determines the area size corresponding to the finger size of the player by referring to the finger size determination results 552 (see FIG. 15) and the retouch determination area initial setting data 526 (see FIG. 14) (step S102).

When the history of a given number of shift amounts has been stored as the retouch shift amount history data 570 (YES in step S104), the processing section 200 sets the retouch determination area 22 having the determined area size around a position offset from the touch cancellation position coordinates 562 by the average shift amount (step S106). Specifically, the touch cancellation detection device ID 560 is copied to the determination area setting target device ID 572a stored as the retouch determination area data 5672, and the vertex coordinates of the determination area are stored as the determination area vertex data 572b. The processing section 200 thus completes the retouch determination area setting process.

When the history of a given number of shift amounts has not been stored as the retouch shift amount history data 570 (NO in step S104), the processing section 200 sets the retouch determination area 22 having the determined area size around the touch cancellation position (step S108) to complete the retouch determination area setting process.

When the processing section 200 has determined that the display size of the cube 2 at the touch cancellation position satisfies the retouch determination area setting condition (NO in step S100), the processing section 200 initializes the retouch determination area setting data 572 (i.e., clears the retouch determination area setting) (step S110) to complete the retouch determination area setting process.

Note that initialization of the retouch determination area setting data 572 refers to setting the surface of the cube 2 that faces the virtual camera 6 as the retouch determination area 22.

Again referring to the flowchart illustrated in FIG. 17, when the processing section 200 has detected that the player has touched the retouch determination area 22 within a given time from the touch cancellation time 564 YES in step S130), the processing section 200 calculates the shift amount between the touch cancellation position 20 and the detected touch position, and adds the calculated shift amount to the retouch shift amount history data 570 (step S131). When the current setting target of the retouch determination area 22 is the touch panel 1506 ("Touch panel" in step S132), the processing section 200 moves the cube 2 (highlighted cube (object) corresponding to the touch cancellation position downward by the height of one cube (step S134). When the current setting target of the retouch determination area 22 is the rear touch pad 1508 ("Rear touch pad" in step S132), the processing section 200 moves the cube 2 (object) corresponding to the touch cancellation position upward by the height of one cube (step S136).

The processing section 200 then updates the touch cancellation time 564 with the current time (step S138), and returns to the step S130.

Therefore, the player can successively move the cube 2 upward/downward by successively performing the touch operation within the retouch determination area after cancelling the touch operation.

When the player has moved the cube 2 upward/downward the desired number of times, or desires to select another cube 2, the player may not perform the touch operation until the given time in the step S130 expires, or may perform the touch operation in an area outside the retouch determination area 22. When the processing section 200 has not detected that the player has touched the retouch determination area 22 within the given time from the touch cancellation time 564 (NO in step S130), the processing section 200 clears the touch cancellation detection device ID 560, the touch cancellation position coordinates 562, and the touch cancellation time 564 (step S154), and cancels highlighting of the cube (step S156) to prepare for detection of another first touch operation.

When the processing section 200 has detected that the player has performed a player character moving operation (YES in step S158), the processing section 200 moves the player character 4 corresponding to the player character moving operation (step 5160). When automatically controlling the movement of the player character 4, the steps S158 and S160 are replaced with an automatic control step.

When the processing section 200 has determined that the game end condition has not been satisfied (i.e., the player character 4 has not reached the goal point 2 (2g)) (NO in step S162), the processing section 200 returns to the step S50 (see FIG. 16).

When the processing section 200 has determined that the game end condition has been satisfied (YES in step S162), the processing section 200 performs a game end process such as calculating and displaying the score corresponding to the time required, or displaying an ending image (step S164) to complete the process.

According to the first embodiment, when the player has performed the retouch operation on the rear touch pad at the touch cancellation position, it is possible to allow a shift between the touch cancellation position and the retouch position to implement excellent operability. Since a situation in which the retouch operation performed by the user is not appropriately reflected in the game (i.e., the user is confused) is prevented, the user is fully involved in the game, and can enjoy and concentrate on the game.

According to the first embodiment, the size of the retouch determination area 22 can be changed corresponding to the estimated finger size of the player. This makes it possible to entertain various users with excellent operability irrespective of the thickness of the finger.

According to the first embodiment, the position of the retouch determination area 22 can be offset corresponding to the tendency of each player when each player sets the touch cancellation position and the retouch position. This makes it possible to more effectively allow a shift in retouch position.

Second Embodiment

A second embodiment to which the invention is applied is described below Note that the same elements as those described above in connection with the first embodiment are indicated by identical reference signs, and description thereof is omitted. The following description mainly focuses on the differences from the first embodiment.

Figure 20:
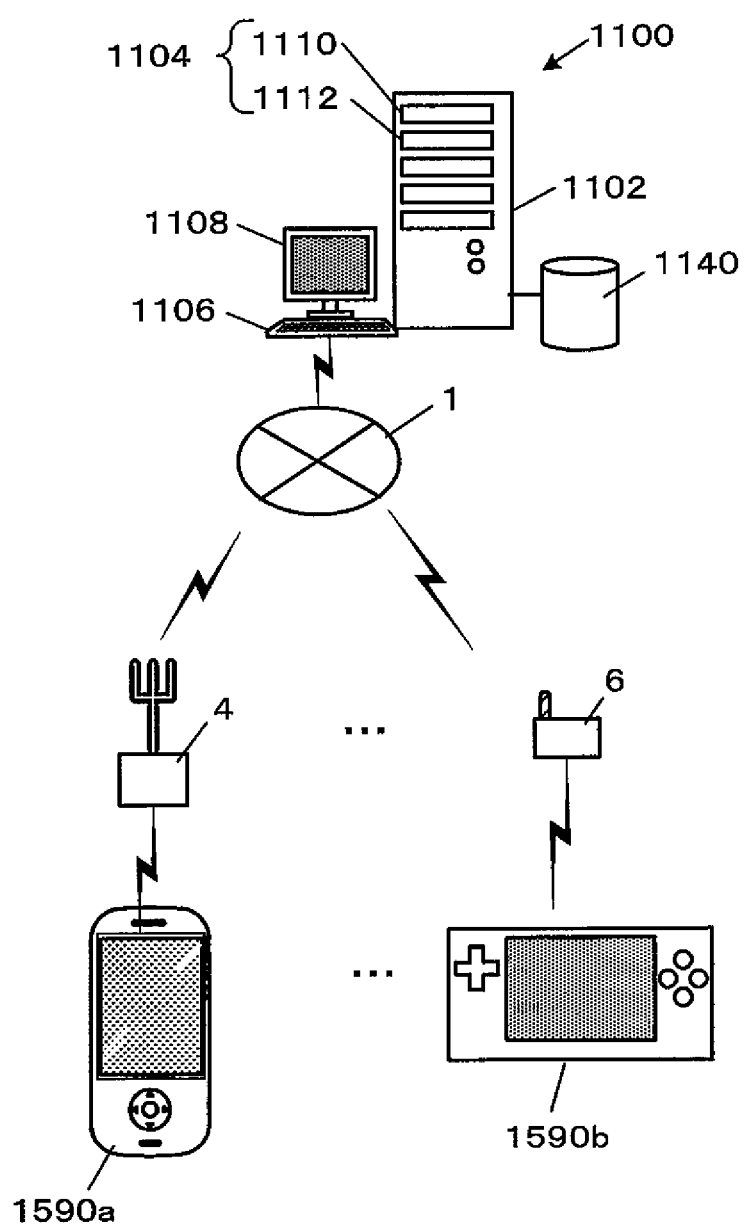
FIG. 20 is a view illustrating a system configuration example according to a second embodiment.

FIG. 20 is a view illustrating an example of the configuration of a game system according to the second embodiment. The game system according to the second embodiment includes a game server 1100 that can connect to a communication line 1, and game terminals 1590a, 1590b, . . . , that are provided for each player, The game server 1100 corresponds to a computer system to which the invention is applied. The game server 1100 includes one or a plurality of servers, a storage device, and the like. The game server 1100 provides various services for managing an online game, and can distribute a client program and various types of data necessary for executing the game.

The game server 1100 includes a housing 1102, a keyboard 1106, a display 1108, and a storage 1140. A plurality of blade servers 1104 are provided in the housing 1102.

The blade servers 1104 include (1) an account management server 1110 that implements a user registration process, a player character initial setting process, a log-in/log-out management process, a save data management process, and the like, and (2) a game data management server 1112 that receives operation input information from the game terminals 1590a, 1590b, . . . that have logged in and participate in the online game, manages the game status of each player, and distributes data necessary for the game process, for example.

Note that each of the blade servers 1104 may be implemented as an independent device that can perform data communication through the communication line 1, and appropriately exchanges information necessary for the game server 1100. The functions of the blade servers may be implemented by the plurality of blade servers in cooperation.

The game terminals 1590a, 1590b, . . . are computers (electronic instruments) respectively provided for each player. For example, the game terminals 1590a, 1590b, . . . are implemented by a consumer game device, a portable game device, a smartphone, a personal computer, an electronic book reader, a car navigation system, and the like. The game terminals 1590a, 1590b, . . . can connect to the communication line 1 through a mobile phone base station 4, a wireless base station 6, and a fixed line, and access the game server 1100. The game terminals 1590a, 1590b, . . . include a touch panel 1506 and a rear touch pad 1508 in the same manner as the game device 1500 according to the first embodiment.

The game terminals 1590a, 1590b, . . . execute a given client program or web browser software, and access and log in to the game server 1100. The game terminals 1590a, 1590b, . . . transmit the operation input information to the game server 1100, acquire information for displaying a game screen from the game server 110, and display the game screen.

In the second embodiment, the game server 1100 manages the game status of each player, and performs the retouch operation determination process, and the game terminals 1590a, 1590b, . . . do no set the retouch operation area 22 and the like.

The functional configuration of the game server 1100 is described below.

Figure 21:
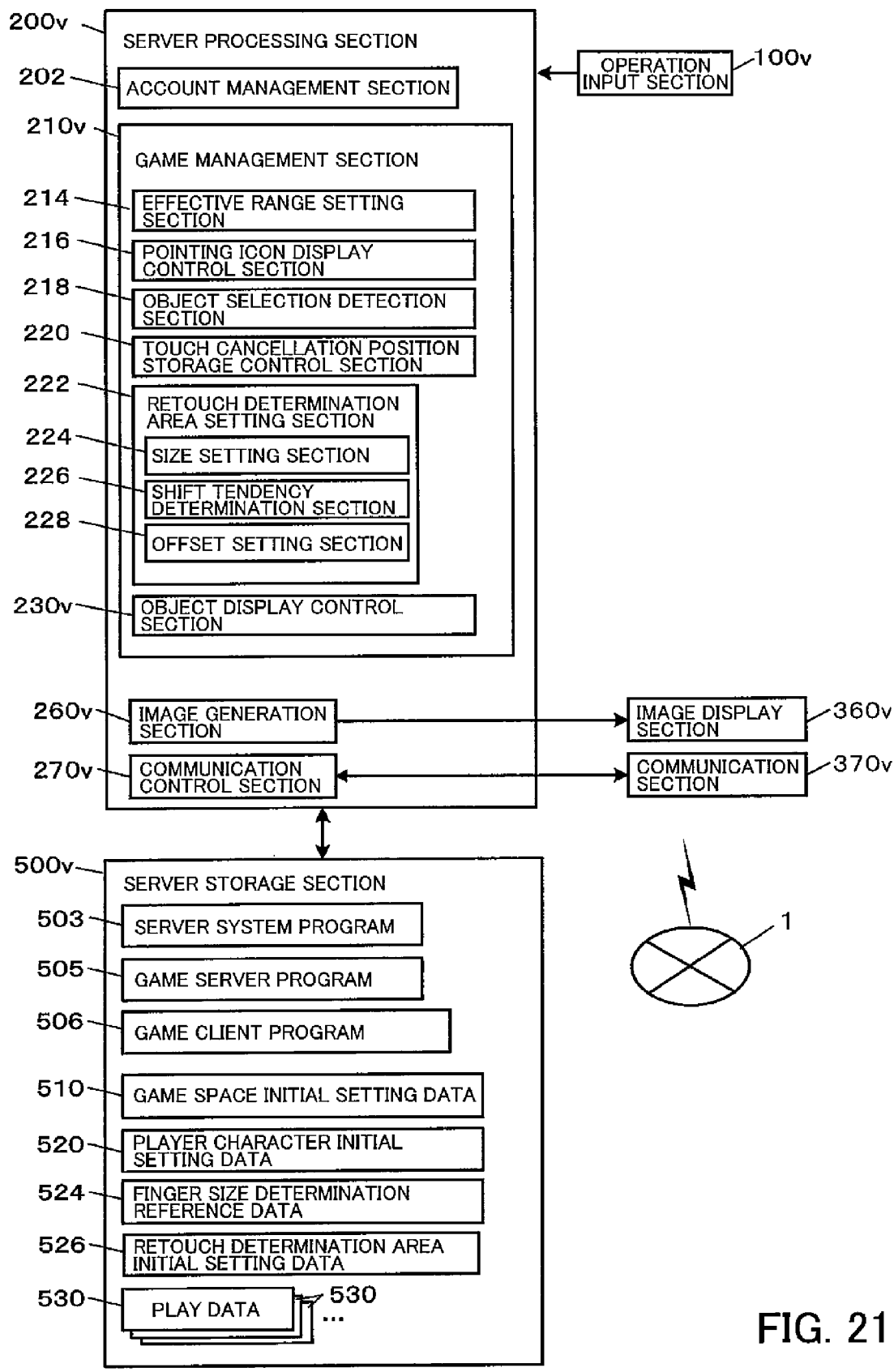
FIG. 21 is a functional block diagram illustrating a functional configuration example of a game server according to the second embodiment.

FIG. 21 is a functional block diagram illustrating a functional configuration example of the game server 1100 according to the second embodiment. As illustrated in FIG. 21, the game server 1100 includes an operation input section 100v, a server processing section 200v, an image display section 360v, a communication section 370v, and a server storage section 500v.

The operation input section 100v receives an operation input for managing the game server, and outputs an operation input signal to the server processing section 200v. The operation input section 100v is implemented by an input device (e.g., keyboard, touch panel, and mouse). The keyboard 1106 illustrated in FIG. 20 corresponds to the operation input section 100v.

The server processing section 200v is implemented by a microprocessor CPU and GPU), an ASIC, an IC memory, and the like. The server processing section 200v performs various calculation processes based on a given program, data, the operation input signal from the operation input section 100v, and the like to control the operation of the game server 1100.

The server processing section 200v includes an account management section 202, a game management section 210v, an image generation section 260v, and a communication control section 270v.

The account management section 202 performs a player registration (synonymous with user registration) process and a player character setting process. The save data including personal information about a newly registered player and player character setting information is stored and managed by the server storage section 500v as play data 530 provided for each player.

The game management section 210v corresponds to the game control section 210 (see FIG. 11) according to the first embodiment, and controls the game status of each player. The game management section 210v includes an effective range setting section 214 a pointing icon display control section 216, an object selection detection section 218, a touch cancellation position storage control section 220, a retouch determination area setting section 222, and an object display control section 230v. Note that the effective range setting section 214, the pointing icon display control section 216, the object selection detection section 218, and the touch cancellation position storage control section 220 perform a process using the touch operation input signals received from the game terminals 1590a, 1590b, . . . The object display control section 230v corresponds to the object control section 230 according to the first embodiment. The object display control section 230v performs a given display control process on the selected cube 2 (object) when the touch position has been performed within the retouch determination area 22. Specifically, the object display control section 230v moves the cube 2, and causes the game terminals 1590a, 1590b, . . . to display the state after the cube 2 has moved.

The image generation section 260v performs an image generation process for displaying server management information on the image display section 360v. Note that the image generation section 260v may be implemented in the same manner as the image generation section 260 according to the first embodiment.

The image display section 360v may be implemented in the same manner as the image display section 360 according to the first embodiment. The display 1108 illustrated in FIG. 20 corresponds to the image display section 360v.

The communication control section 270v and the communication section 370v may be implemented in the same manner as the communication control section 270 and communication section 370 according to the first embodiment. The communication control section 270v and the communication section 370v implement data communication through the communication line 1.

The server storage section 500v stores a program and game data that causes the server processing section 200v to implement various functions. The server storage section 500v is used as a work area for the server processing section 200v, and temporarily stores the results of calculations performed based on a program, information received from each game terminal, and the like. The function of the server storage section 500v is implemented by an IC memory (e.g., RAM and ROM), a magnetic disk (e.g., hard disk), an optical disk (e.g., CD-ROM and DVD), and the like. The storage 1140 illustrated in FIG. 20 corresponds to the server storage section 500v.

The server storage section 500v stores a server system program 503, a game server program 505, a game client program 506, game space initial setting data 510, player character initial setting data 520, finger size determination reference data 524, and retouch determination area initial setting data 526 in advance. The server storage section 500v stores the play data 530 of each player as data that is appropriately generated and updated. The server storage section 500v also appropriately stores information (e.g., time limit count value and flag) that is required for game management and the like.

The server system program 503 causes a computer to implement the basic functions of a server.

The game server program 505 causes the server processing section 200v to implement the functions of the game management section 210v.

The game client program 506 is an original client program provided to the game terminals 1590a, 1590b, . . . The game terminals 1590a, 1590b, . . . can access and log in to the game server 1100, and execute the game by downloading and executing the game client program 506. Note that the game client program 506 is implemented by a dedicated program, a web browser program, a plug-in that implements dynamic display on the program, and the like.

Figure 22:
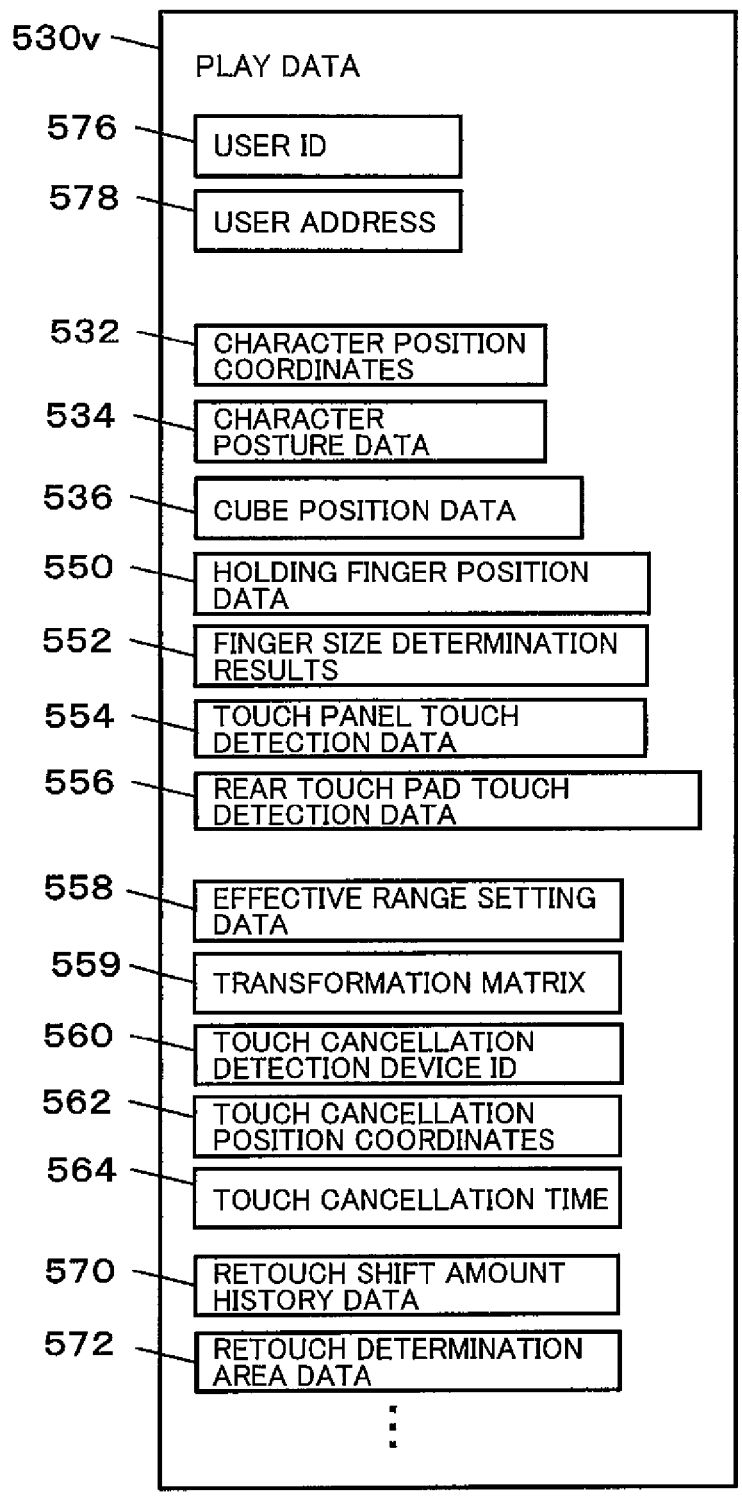
FIG. 22 is a view illustrating a data configuration example of play data according to the second embodiment.

FIG. 22 is a view illustrating a data configuration example of the play data 530v according to the second embodiment. The play data 530v is basically the same as the play data according to the first embodiment, but further includes a user ID 576 and a user address 578 as information for identifying the user. The user address 578 is address information for transmitting data to a specific device through the communication line 1.

Figure 23:
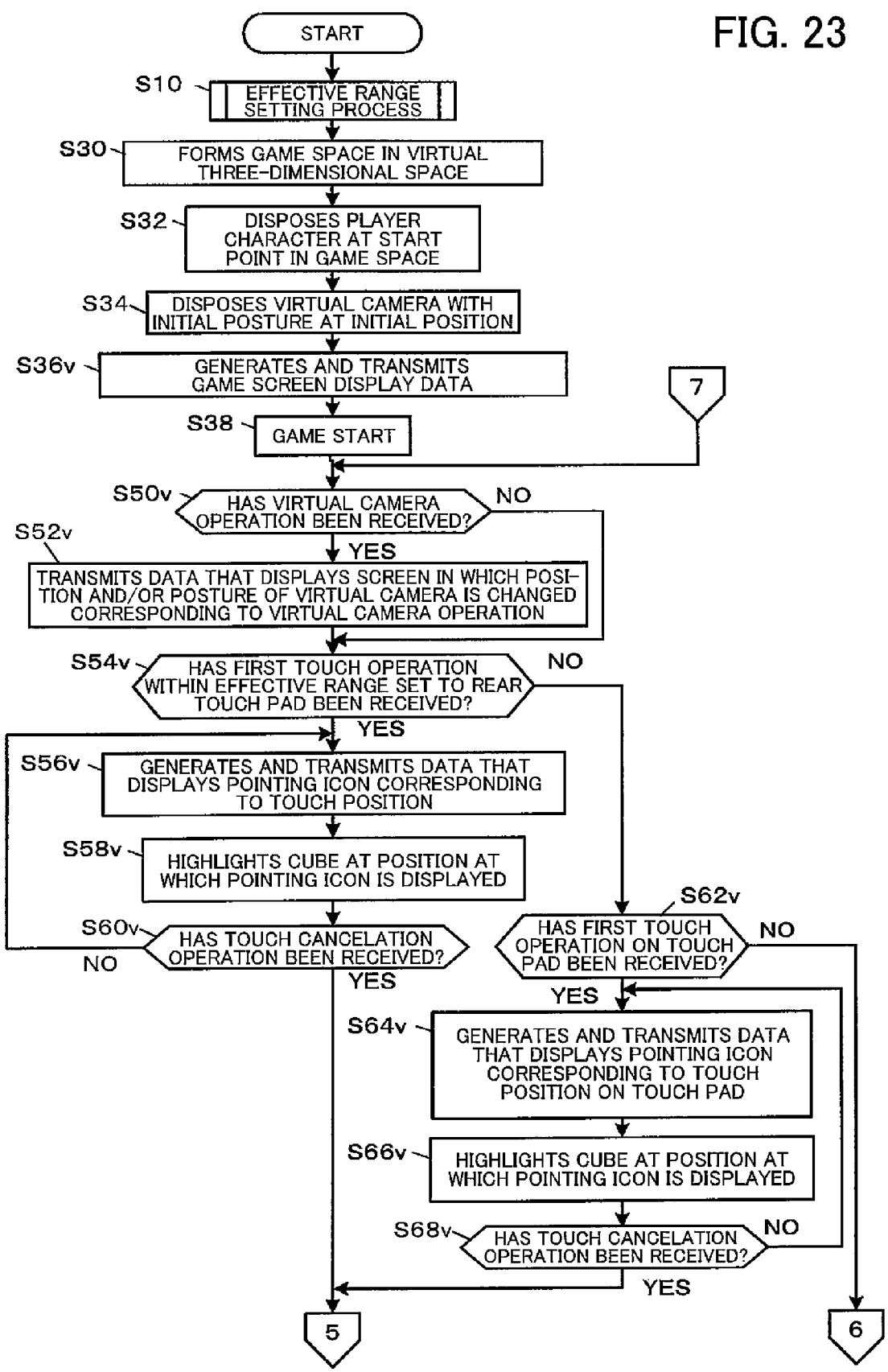
Figure 24:
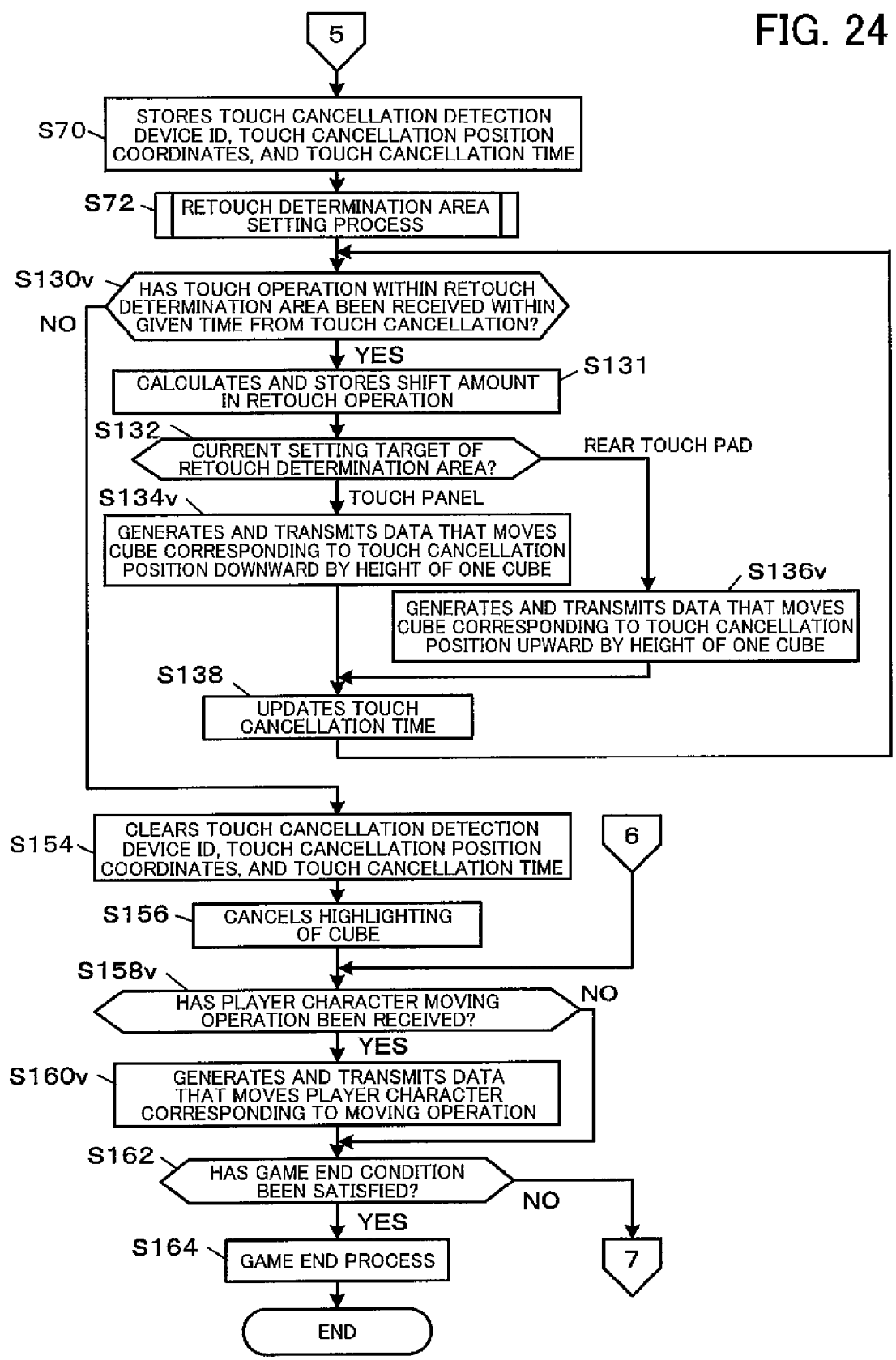
FIG. 24 is a flowchart that follows FIG. 23.

FIGS. 23 and 24 are flowcharts illustrating the flow of the main process performed by the game server 1100 according to the second embodiment for managing the game played by one player who has logged in. The main process illustrated in FIGS. 23 and 24 is basically implemented in the same manner as the flow of the main process according to the first embodiment, except that the steps performed by the processing section 200 are performed by the server processing section 200v. Note that the step in which the game device 1500 generates the game screen, and the step in which the game device 1500 detects and deals with an operation input are replaced with a step that exchanges data with the game terminals 1590a, 1590b, . . . More specifically, the main process illustrated in FIGS. 23 and 24 includes a process that generates and transmits data for displaying the game screen (e.g., step S36v), a process that changes the viewpoint position of the game image corresponding to the operation input (e.g., steps S50v and S52v), a process that receives a. signal that indicates detection of a touch operation on the touch panel 1506 or the rear touch pad 1508, and causes the game terminals 1590a, 1590b, . . . to change the display position of the pointing icon 12 and the display state of the cube 2 corresponding to the touch operation (e.g., steps S54v to S58v, S62v to S66v, S134v, and S136v), and the like. The effective range setting process and the retouch determination area setting process are performed in the same manner as in the first embodiment.

According to the second embodiment, effects similar to those achieved by the first embodiment can be achieved in the online game in which the game terminal utilizes the game server.

Modifications

The embodiments to which the invention is applied have been described above. Note that the invention is not limited thereto. Various modifications may be appropriately made, such as adding other elements, omitting some of the elements, or changing some of the elements.

First Modification

Although the above embodiments have been described taking an example in which the retouch determination area 22 is set when the touch operation is performed on the touch panel 1506 or the rear touch pad 1508, the retouch determination area 22 may not be set when the touch operation is performed on the touch panel 1506. For example, the steps S72 to S134 may be skipped, and the step S136 may be performed when the first touch operation has been performed on the touch panel 1506.

Second Modification

Although the above embodiments have been described taking an example in which the retouch determination area 22 is offset from the touch cancellation position 20 corresponding to the shift tendency when the player retouches the touch cancellation position 20 (see FIG. 10), the retouch determination area 22 may not be offset as long as it is possible to allow the shift tendency.

Figure 25:
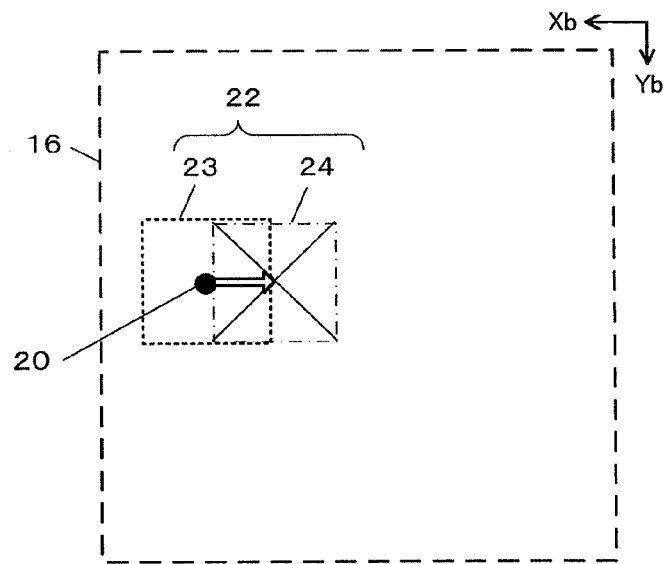
FIG. 25 is a view illustrating a modification of a retouch determination area setting method.

As illustrated in FIG. 25, the retouch determination area 22 may be formed by a basic area 23 and an extension area 24. The basic area 23 may be set to have a given relative positional relationship around the touch cancellation position 20, and one or a plurality of extension areas 24 may be set around the offset position (see the first embodiment) corresponding to the shift tendency to set the range that is extended in the transverse direction and includes the range corresponding to the display size of the selected cube 2 as the determination area.

In this case, the size of the retouch determination area 22 determined in the step S102 (see FIG. 19) may be applied to both the basic area 23 and the extension area 24.

The basic area 23 may be set to have a predetermined shape, or may be set as a range having the same shape and the same size as those of the selected cube 2.

The extension ratio in the transverse direction may be changed based on the touch position (touch cancellation position 20) when the cube 2 has been selected or the touch operation has been canceled. Specifically, the size of the extension area 24 may be increased in the transverse direction as the distance from the left edge or the right edge (dominant arm-side edge) of the effective range 16 to the touch cancellation position 20 increases. There is a tendency in which the shift amount increases when the player retouches a remote position as compared with the case where the player retouches a close position. It is possible to more effectively allow a shift in retouch position by changing the extension ratio.

The determination area may be extended by setting the retouch determination area 22 to have a square or circular basic shape, and deforming or rotating the retouch determination area 22 so as to allow the shift tendency. For example, the basic shape may be flattened (e.g., rectangular shape or elliptical shape) as the average value or the median value of the shift amount increases, and the determination area may be rotated so that the longitudinal direction after deformation coincides with the average value or the median value of the shift direction.

Third Modification

Figure 26:
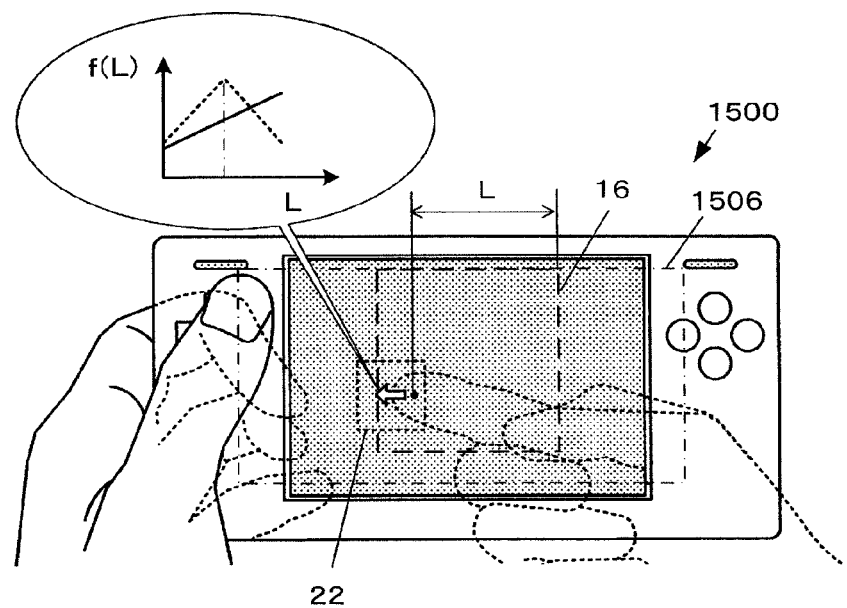
FIG. 26 is a view illustrating a modification of a retouch determination area setting method.

Although the above embodiments have been described taking an example in which the offset amount of the retouch determination area 22 is fixed, the offset amount of the retouch determination area 22 may be appropriately changed. As illustrated in FIG. 26, the offset amount f(L) may be increased as the distance (distance L in FIG. 26) from the dominant arm-side edge to the touch cancellation position 20 increases, for example. The shift amount tends to increase when the player performs a touch operation aimed at a remote point. It is possible to deal with such a tendency by changing the offset amount, and more appropriately allow a shift in retouch operation. When it is desired to achieve the same effect irrespective of the dominant arm, the offset amount f(L)

may be set to become a maximum at the center of the effective range 16 in the transverse direction.

Figure 27:
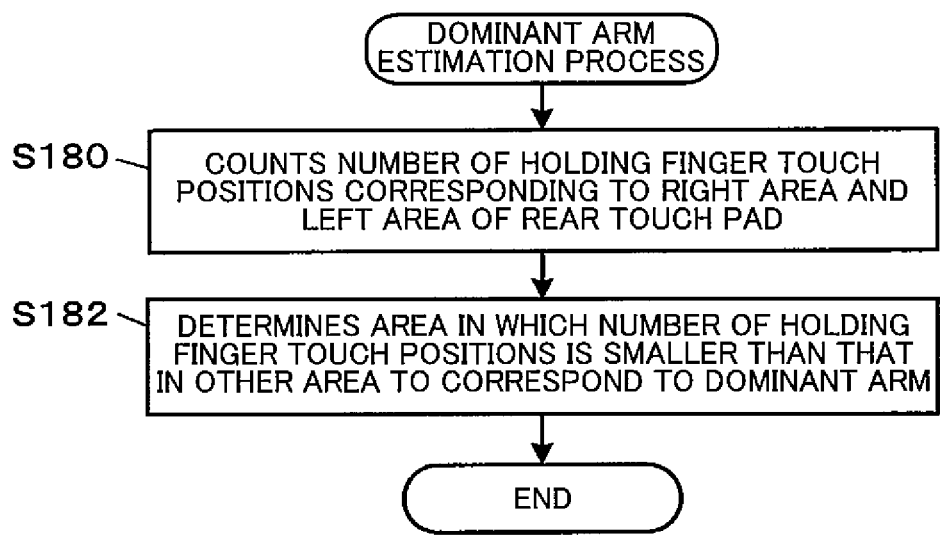
FIG. 27 is a flowchart illustrating the flow of a dominant arm estimation process.

Information about the dominant arm of the player may be selected/input by the player before starting the game, or the dominant arm of the player may be estimated. For example, a dominant arm estimation process illustrated in FIG. 27 may be appropriately performed during or after the effective range setting process. In the dominant arm estimation process, the processing section 200 counts the number of holding finger touch positions corresponding to the right area and the left area of the rear touch pad 1508 (step S180), and determines the area in Which the number of holding finger touch positions is smaller than that in the other area to correspond to the dominant arm (step S182). Specifically, the number of holding fingers of the dominant arm is smaller than that of the non-dominant arm when performing a touch operation while holding the main body, or when performing a touch operation on the rear touch pad 1508 while holding the main body with the fingers of the non-dominant arm.

Fourth Modification

Although the above embodiments have been described taking an example in Which the retouch determination area 22 is set based on the touch cancellation position 20, the retouch determination area 22 may be linked to a given object in advance. As illustrated in FIG. 28 (see (1)), a specific application determination area 25 that corresponds to the retouch determination area 22 may be set to an item 30 that can be acquired by the player character 4 during the game, or a moving enemy character 32 that damages the player character 4 in advance.

Figure 29:
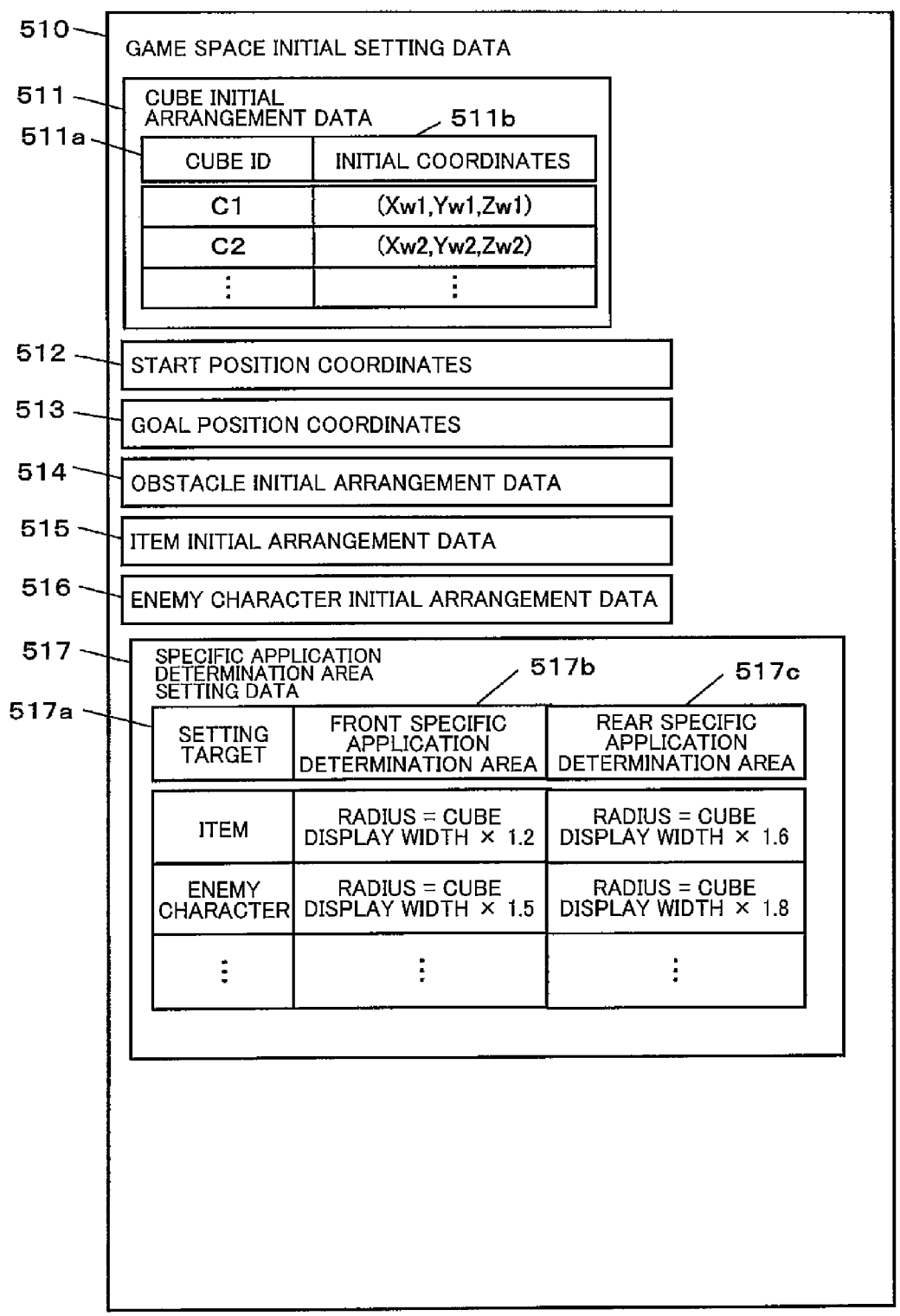
FIG. 29 is a view illustrating a modification of game space initial setting data.

In this case, the game space initial setting data 510 may include item initial arrangement data 515, enemy character initial arrangement data 516, and specific application determination area setting data 517 (see FIG. 29).

The specific application determination area setting data 517 may include a specific application determination area 25, and a setting target 517*a* that indicate the type of given object. It is preferable to set a rear specific application determination area 517*c* for the rear touch-operated device (rear touch pad 1508) to be larger than a front specific application determination area 517*b* for the front touch-operated device (touch panel 1506).

This makes it possible to move the cube 2 upward/downward without selecting the cube 2 when changing the arrangement of the cube 2 in order to acquire the item 30, or changing the arrangement of the cube 2 in order to limit the action of the enemy character 32, so that an operation feel can be improved. Since a shift in touch operation is allowed even if the player has touched an area that differs from the target position to some extent, the player can move the cube as desired, and acquire the item 30, or defends the player character 4 from the enemy character 32 even if the player performs a quick operation.

Fifth Modification

Although the above embodiments have been described taking an example in which the retouch determination area 22 is used to move the object (cube 2) that appears in the game, the retouch determination area 22 may also be appropriately applied to an operation input performed on a display object (e.g., selection button, tag, or lever) displayed on the game screen.

Sixth Modification

Figure 30:
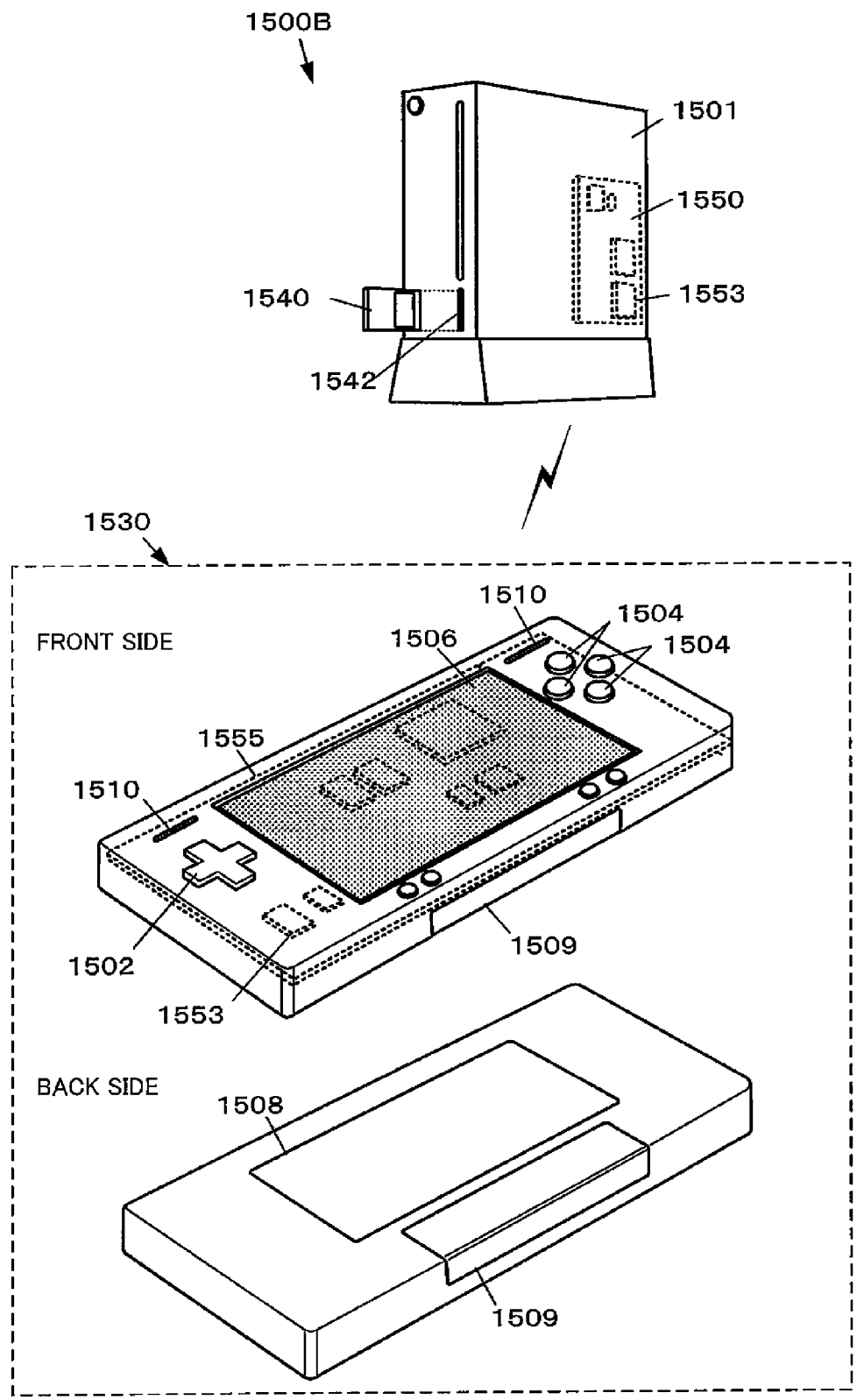
FIG. 30 is a view illustrating a configuration example of a game system.

Although the above embodiments have been described taking an example in which the game device integrally includes the display device that displays the game screen, the touch-operated device, and the control board, a main device 1501 (computer system) and a controller 1530 (electronic instrument) that includes a touch panel 1506 and a rear touch pad 1508 and can be held by the user may be separately provided (see a game device 1500B illustrated in FIG. 30), and the main body 1501 and the controller 1530 may be connected via wireless communication.

The controller 1530 may include a controller control board. The controller 1530 transmits an operation input signal to the main device 1501, and displays a game screen on the touch panel 1506 based on data received from the main device 1501. In this case, a control board 1550 included in the main device 1501 sets the retouch determination area 22, determines a retouch operation, and controls the object in the game space. For example, the game terminals 1590*a* and 1590*b* according to the second embodiment may be replaced with the controller 1530, and the game server 1100 may be replaced with the main device 1501.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed:

1. A method for controlling a computer that is held and operated by a user, the method comprising:
    displaying a plurality of objects based on a given virtual camera on a display device that is provided on a front side of the computer, the plurality of objects being disposed inside a virtual three-dimensional space;
    selecting one object among the plurality of objects based on a positional relationship between a position of a first touch operation and a display position on the display device when the user has performed the first touch operation on a touch-operated device that is provided on a back side of the computer that cannot be observed by the user when the user observes the display device;
    determining a distance from the given virtual camera to the one object;
    setting a determination area for reselecting the one object on the touch-operated device and setting a size of the determination area based on the distance that is determined from the given virtual camera to the one object; and
    performing a given control process on the one object when the user has performed a second touch operation within the determination area.

2. The method as defined in claim 1,
    the setting of the determination area including setting a range as the determination area, the range at least including a touch operation range of the touch-operated device that corresponds to a display range of the one object based on a positional relationship between the front side and the back side of the computer.

3. The method as defined in claim 2,
    the setting of the determination area including changing a size of the touch operation range based on a display size of the one object.

4. The method as defined in claim 2,
    the computer having a structure that is held and operated by both hands, and including an operation section that can be operated by a thumb on each side of the display device,
    the touch-operated device being provided in a center area of the back side of the computer, and
    the setting of the determination area including setting the determination area by extending the touch operation range that corresponds to the display range of the one object so that an extension ratio in a transverse direction is larger than an extension ratio in a vertical direction.

5. The method as defined in claim 4,
the setting of the determination area including changing the extension ratio in the transverse direction based on the position of the first touch operation.

6. The method as defined in claim 2,
the setting of the determination area including setting an extension area that overlaps or is adjacent to the touch operation range, and setting the determination area by combining the touch operation range and the extension area.

7. The method as defined in claim 6,
the setting of the extension area including setting the extension area based on the position of the first touch operation.

8. The method as defined in claim 1, further comprising:
setting an effective range in a touch operation area of the touch-operated device in an area other than a range in which a finger of the user that holds the computer touches the touch-operated device,
the setting of the determination area including setting the determination area within the effective range.

9. The method as defined in claim 1, further comprising:
changing a size of the determination area based on a touch area of the first touch operation.

10. The method as defined in claim 1, further comprising:
determining a shift tendency between the position of the first touch operation and a position of the second touch operation,
the setting of the determination area including setting the determination area based on the shift tendency.

11. The method as defined in claim 1, further comprising:
disabling the determination area when a given time has elapsed after the first touch operation has been canceled.

12. The method as defined in claim 1,
the setting of the size of the determination area including:
determining whether the distance is larger than a reference value;
setting the size of the determination area to have a size corresponding to a display size of the one object, when the distance is determined to be larger than the reference value; and
setting the size of the determination area to have a range that is larger than the display size of the one object, when the distance is determined to be smaller than the reference value.

13. A method for controlling a computer that is held and operated by a user, the computer including a display device and a front touch-operated device integrated with the display device on a front side, and including a rear touch-operated device on a back side, the method comprising:
displaying an object based on a given virtual camera on the display device, the object being disposed inside a virtual three-dimensional space;
determining a distance from the given virtual camera to the one object;
setting a front determination area to the front touch-operated device, and setting a rear determination area that is larger than the front determination area to the rear touch-operated device as a determination area for selecting the object;
setting a size of the rear determination area based on the distance that is determined from the given virtual camera to the one object; and
performing a first control process on the object when the user has performed a touch operation within the front determination area, and performing a second control process on the object when the user has performed a touch operation within the rear determination area.

14. the method as defined in claim 13,
the setting of the size of the rear determination area including:
determining whether the distance is larger than a reference value;
setting the size of the rear determination area to have a size corresponding to a display size of the object, when the distance is determined to be larger than the reference value; and
setting the size of the rear determination area to have a range that is larger than the display size of the object, when the distance is determined to be smaller than the reference value.

15. An electronic instrument that is held and operated by a user, the electronic instrument comprising:
a display device that is provided on a front side of the electronic instrument;
a touch-operated device that is provided on a back side of the electronic instrument;
an object display control section that displays a plurality of objects based on a given virtual camera on the display device, the plurality of objects being disposed inside a virtual three-dimensional space;
a detection section that detects that one object among the plurality of objects has been selected when the user has performed a first touch operation based on a positional relationship between a position of the first touch operation and a display position on the display device;
a distance determination section that determines a distance from the given virtual camera to the one object;
a determination area setting section that sets a determination area for reselecting the one object on the touch-operated device and sets a size of the determination area based on the distance that is determined from the given virtual camera to the one object; and
an object control section that performs a given control process on the one object when the user has performed a second touch operation within the determination area.

16. The electronic instrument as defined in claim 15,
determining whether the distance is larger than a reference value;
the determination area setting section setting the determination area to have a size corresponding to a display size of the one object, when then distance is determined to be larger than the reference value; and
the determination area setting section setting the determination area to have a range that is larger than the display size of the one object, when the distance is determined to be smaller than the reference value.

17. An electronic instrument that is held and operated by a user, the electronic instrument comprising:
a display device and a front touch-operated device integrated with the display device, the display device and the front touch-operated device being provided on a front side of the electronic instrument;
a rear touch-operated device that is provided on a back side of the electronic instrument;
an object display control section that displays an object based on a given virtual camera on the display device, the object being disposed inside a virtual three-dimensional space;

a distance determination section hat determines a distance from the given virtual camera to the object;

a determination area setting section that sets a front determination area to the front touch-operated device, and sets a rear determination area that is larger than the front determination area to the rear touch-operated device as a determination area for selecting the object, and sets a size of the rear determination area based on the distance that is determined from the given virtual camera to the one object; and an object control section that performs a first control process on the object when the user has performed a touch operation within the front determination area, and performs a second control process on the object when the user has performed a touch operation within the rear determination area.

18. The electronic instrument as defined in claim 17, determining whether the distance is larger than a reference value;

the determination area setting section setting the rear determination area to have a size corresponding to a display size of the object, when the distance is determined to be larger than the reference value; and the determination area setting section setting the rear determination area to have a range that is larger than the display size of the object, when the distance is determined to be smaller than the reference value.

* * * * *